US008848823B2

(12) United States Patent
Yang et al.

(10) Patent No.: US 8,848,823 B2
(45) Date of Patent: Sep. 30, 2014

(54) SYSTEMS, METHODS, AND DEVICES TO PERFORM INTERLEAVING

(75) Inventors: Lin Yang, San Diego, CA (US); Didier Johannes Richard Van Nee, Woerden (NL); Hemanth Sampath, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 13/586,667

(22) Filed: Aug. 15, 2012

(65) Prior Publication Data
US 2013/0208821 A1 Aug. 15, 2013

Related U.S. Application Data

(60) Provisional application No. 61/566,582, filed on Dec. 2, 2011, provisional application No. 61/568,083, filed on Dec. 7, 2011, provisional application No. 61/616,686, filed on Mar. 28, 2012.

(51) Int. Cl.
*H04L 27/26* (2006.01)
*H04L 27/06* (2006.01)
*H04L 1/00* (2006.01)
*H04L 5/00* (2006.01)

(52) U.S. Cl.
CPC .......... *H04L 27/2608* (2013.01); *H04L 1/0071* (2013.01); *H04L 5/0044* (2013.01); *H04L 27/2602* (2013.01); *H04L 27/2601* (2013.01)
USPC .......................................... 375/295; 375/340

(58) Field of Classification Search
CPC ....... H04L 1/0071; H04L 1/06; H04L 1/0033; H04L 27/2601; H03M 13/27; H03M 13/271; H03M 27/07; H03M 13/2778; G11B 20/1866
USPC ......... 375/259–260, 265, 285, 295, 316, 346; 370/334–343, 350, 465
See application file for complete search history.

(56) References Cited

U.S. PATENT DOCUMENTS

| 6,643,281 | B1 * | 11/2003 | Ryan .............................. 370/350 |
| 7,158,498 | B2 | 1/2007 | Lundby et al. |
| 7,426,232 | B2 * | 9/2008 | Matsuoka et al. ............ 375/148 |
| 7,917,370 | B2 * | 3/2011 | Tsai et al. ..................... 704/500 |
| 8,050,349 | B2 | 11/2011 | Ghosh et al. |
| 8,077,627 | B2 * | 12/2011 | Chang et al. .................. 370/252 |
| 8,126,077 | B2 | 2/2012 | Sandhu |
| 8,411,781 | B2 * | 4/2013 | Uln et al. ...................... 375/267 |

(Continued)

OTHER PUBLICATIONS

International Search Report and Written Opinion—PCT/US2012/067617—ISA/EPO—Feb. 27, 2013.

(Continued)

*Primary Examiner* — Khanh C Tran
(74) *Attorney, Agent, or Firm* — Kevin T. Cheatham

(57) ABSTRACT

An apparatus includes an interleaver configured to interleave encoded data and to output a series of interleaved bits to be transmitted via a 1 MHz orthogonal frequency-division multiplexing (OFDM) transmission. The apparatus also includes a modulator configured to modulate the interleaved bits and a transform module configured to transform the modulated bits. A transmit module of the apparatus is configured to transmit the transformed bits included in one or more spatial streams of the 1 MHz OFDM transmission.

45 Claims, 26 Drawing Sheets

(56) References Cited

U.S. PATENT DOCUMENTS

| | | | |
|---|---|---|---|
| 2004/0001554 A1* | 1/2004 | Sun et al. | 375/260 |
| 2006/0104377 A1* | 5/2006 | Chimitt et al. | 375/261 |
| 2011/0116359 A1 | 5/2011 | Li et al. | |
| 2012/0051447 A1 | 3/2012 | Qi et al. | |
| 2012/0063429 A1 | 3/2012 | Yang et al. | |
| 2012/0140613 A1* | 6/2012 | Aldana et al. | 370/208 |

OTHER PUBLICATIONS

Park M., "IEEE P802.11, Wireless LANS, proposed specification framework for Tgah", TGah Spec Framework. doc.: IEEE 802.11-11/1137r5, Jan. 2012.

Srinivasa et al., "11ac 80MHz Transmission Flow, 0548r2", Internet Citation, May 17, 2010, pp. 1-23, XP002662817.

Stacey et al., "Specification Framework for TGac 0992r13", IEEE 802.11 IEEE 802.11-09 Wireless LANs, Jul. 1, 2010, pp. 1-20, XP002662818, Retrieved from the Internet: URL:https://mentor.ieee.org/802.11/dcn/09/11-09-0992-13-00ac-proposed-specificationframework-for-tgac.doc&ei=e-GzTufzBYWCOpHypV4&usg=AFQjCNGnRkFfdRW356zGlsqdnKKs8T__itQ&cad=rja [retrieved on Nov. 4, 2011] p. 13-p. 18.

IEEE P802.11ah™ /D1.0, Sec. 24.3.9.8 "BCC Interleaver," Oct. 2013, pp. 315-316.

* cited by examiner

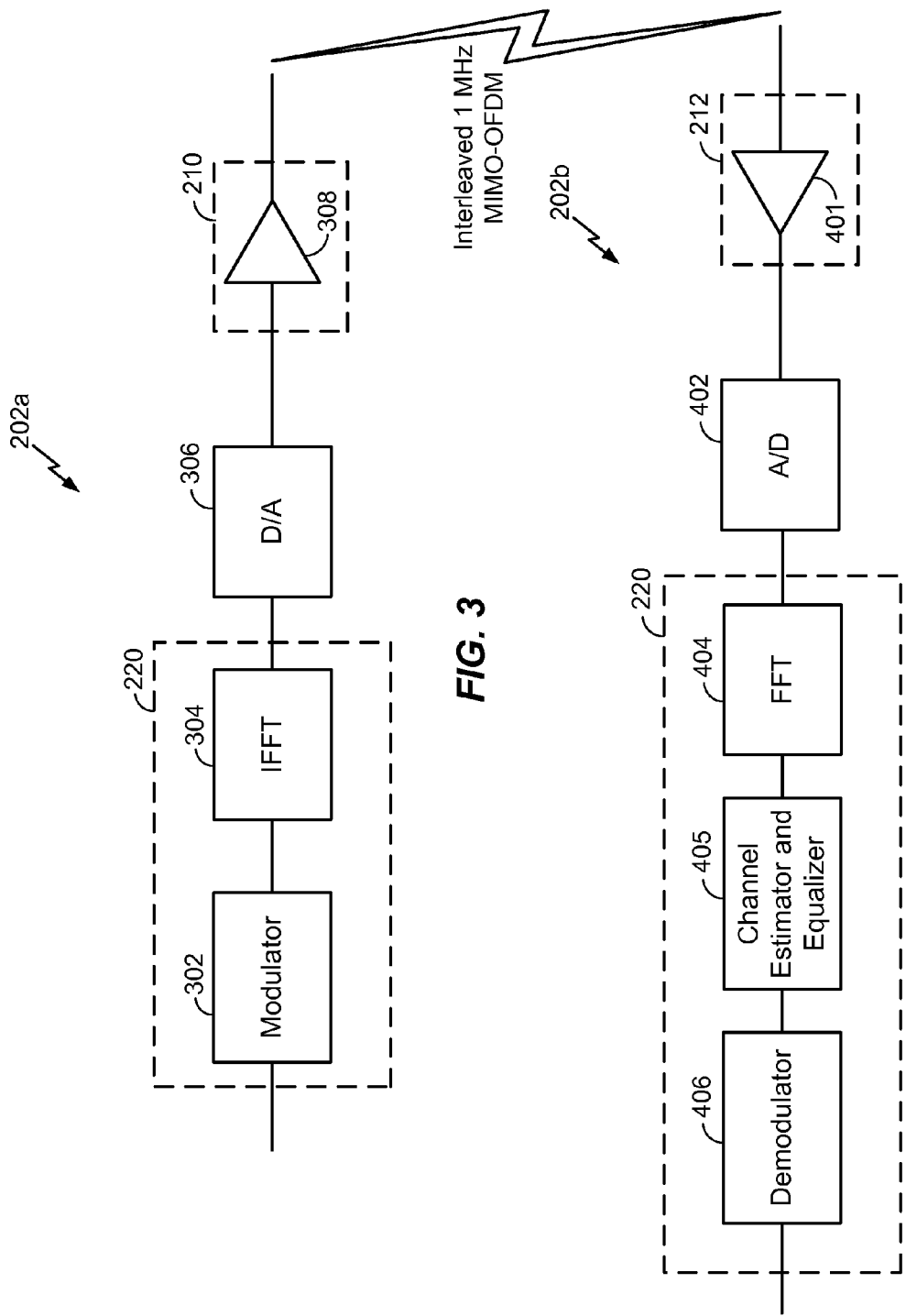

SYSTEMS, METHODS, AND DEVICES TO PERFORM INTERLEAVING

CROSS-REFERENCE TO RELATED APPLICATIONS

The present application claims priority from commonly owned U.S. Provisional Patent Application No. 61/566,582 filed Dec. 2, 2011, U.S. Provisional Patent Application No. 61/568,083 filed Dec. 7, 2011, and U.S. Provisional Patent Application No. 61/616,686 filed Mar. 28, 2012, the contents of which are expressly incorporated herein by reference in their entirety.

FIELD

The present application relates generally to wireless communications, and more specifically to systems, methods, and devices to perform interleaving.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated as a wide area network (WAN), a metropolitan area network (MAN), a local area network (LAN), or a personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may include packets, which in some aspects may be referred to as data units. The packets may include overhead information (e.g., header information, packet properties, etc.) that helps in routing the packet through the network, identifying the data in the packet, processing the packet, etc., as well as data, such as user data, multimedia content, etc. as might be carried in a payload of the packet.

SUMMARY

The systems, methods, and devices of the disclosure each have several aspects, no single one of which is solely responsible for its desirable attributes. Without limiting the scope of this disclosure as expressed by the claims which follow, some features will now be described briefly. After considering this discussion, and particularly after reading the section entitled "Detailed Description" one will understand how the features of this disclosure provide advantages that include optimized interleaving using 1 MHz multiple input multiple output orthogonal frequency-division multiplexing (MIMO-OFDM) transmission.

One aspect of the disclosure provides a wireless communications apparatus that includes an interleaver configured interleave encoded data and to output a series of interleaved bits. The interleaver includes one or more stream interleavers corresponding to one or more spatial streams. The one or more stream interleavers are configured to perform interleaving based on a block size of twenty four, an interleaver depth of eight, interleaved rotation indexes of 0, 2, 1, 3 corresponding to up to four spatial streams, and a base subcarrier rotation of less than or equal to nine (e.g., equal to two). The wireless communications apparatus further a transmit module configured to transmit the interleaved bits included in the one or more spatial streams.

Another aspect of the disclosure provides a method that includes interleaving encoded data and outputting a series of interleaved bits to be transmitted in one or more spatial streams. The interleaving includes using a block size of twenty four, using an interleaver depth of eight, using interleaved rotation indexes of 0, 2, 1, 3 corresponding to up to four spatial streams, and using a base subcarrier rotation of less than or equal to nine (e.g., equal to two). The method further includes transmitting the interleaved bits included in the one or more spatial streams.

Another aspect of the disclosure provides a wireless communications apparatus that includes means for interleaving encoded data to output a series of interleaved bits. The means for interleaving includes one or more stream interleaving means corresponding to one or more spatial streams. The one or more stream interleaving means are for performing interleaving based on a block size of twenty four, an interleaver depth of eight, interleaved rotation indexes of 0, 2, 1, 3 corresponding to up to four spatial streams, and a base subcarrier rotation of less than or equal to nine (e.g., equal to two). The wireless communications apparatus also includes means for transmitting the interleaved bits included in the one or more spatial streams.

Another aspect of the disclosure provides a non-transitory computer-readable medium including instructions that, when executed by a computer, cause the computer to interleave encoded data and output a series of interleaved bits to be transmitted via one or more spatial streams. Interleaving the encoded data includes using a block size of twenty four, using an interleaver depth of eight, using interleaved rotation indexes of 0, 2, 1, 3 corresponding to up to four spatial streams, and using a base subcarrier rotation of less than or equal to nine (e.g., equal to two). The instructions, when executed by the computer, also cause the computer to transmit the interleaved bits included in the one or more spatial streams.

Another aspect of the disclosure provides a wireless communications apparatus that includes a receive module configured to receive data included in one or more spatial streams. The wireless communications apparatus further includes a deinterleaver configured to deinterleave the received data. The deinterleaver includes one or more stream deinterleavers corresponding to the one or more spatial streams. The one or more stream deinterleavers are configured to perform deinterleaving based on a block size of twenty four, an interleaver depth of eight, interleaved rotation indexes of 0, 2, 1, 3 corresponding to up to four spatial streams, and a base subcarrier rotation of less than or equal to nine (e.g., equal to two).

Another aspect of the disclosure provides a method that includes receiving data via one or more spatial streams. The method further includes deinterleaving the received data and outputting a series of deinterleaved bits corresponding to the one or more spatial streams. The deinterleaving includes using a block size of twenty four, using an interleaver depth of eight, using interleaved rotation indexes of 0, 2, 1, 3 corresponding to up to four spatial streams, and using a base subcarrier rotation of less than or equal to nine (e.g., equal to two).

Another aspect of the disclosure provides a wireless communications that includes means for receiving data via one or more spatial streams. The wireless communications apparatus also includes means for deinterleaving the received data. The means for deinterleaving includes one or more stream deinterleaving means corresponding to the one or more spatial streams. The one or more stream deinterleaving means are for performing deinterleaving based on a block size of twenty four, an interleaver depth of eight, interleaved rotation indexes of 0, 2, 1, 3 corresponding to up to four spatial streams, and a base subcarrier rotation of less than or equal to nine (e.g., equal to two).

Another aspect of the disclosure provides a non-transitory computer-readable medium including instructions that, when executed by a computer, cause the computer to receive data via one or more spatial streams. The instructions, when executed by the computer, also cause the computer to deinterleave the received data and output a series of deinterleaved bits corresponding to the one or more spatial streams. Deinterleaving the one or more spatial streams includes using a block size of twenty four, using an interleaver depth of eight, using interleaved rotation indexes of 0, 2, 1, 3 corresponding to up to four spatial streams, and using a base subcarrier rotation of less than or equal to nine.

Another aspect of the disclosure provides an apparatus that includes an interleaver configured interleave encoded data and to output a series of interleaved bits to be transmitted via a 1 MHz OFDM transmission. The apparatus also includes a modulator configured to modulate the interleaved bits and a transform module configured to transform the modulated bits. The apparatus further includes a transmit module configured to transmit a signal corresponding to the transformed bits in one or more spatial streams of the 1 MHz OFDM transmission.

Another aspect of the disclosure provides an apparatus that includes a receive module configured to receive bits included in one or more spatial streams of a 1 MHz OFDM transmission. The apparatus also includes a transform module configured to transform the received bits and a demodulator configured to demodulate the transformed bits. The apparatus further includes a deinterleaver configured to deinterleave the demodulated bits and to output data corresponding to the one or more spatial streams.

BRIEF DESCRIPTION OF THE DRAWINGS

FIG. 3 shows a functional block diagram of exemplary components that may be utilized in the wireless device of FIG. 2 to transmit wireless communications.

FIG. 4 shows a functional block diagram of exemplary components that may be utilized in the wireless device of FIG. 2 to receive wireless communications.

DETAILED DESCRIPTION

Figure 1:
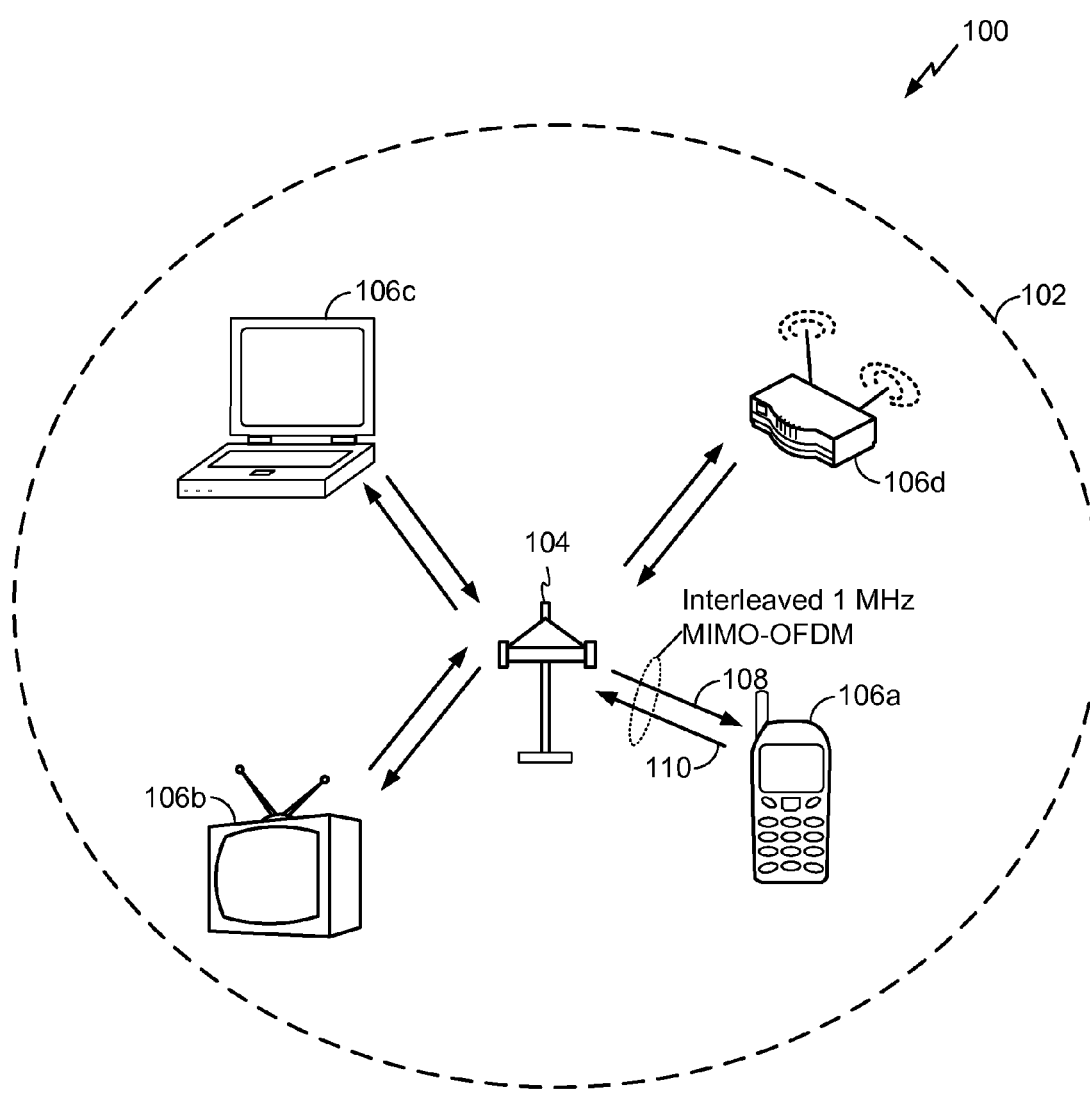
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the Institute of Electrical and Electronics Engineers (IEEE) 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As described above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, such as personal healthcare. The devices may also be used for surveillance, to enable extended-range Internet connectivity (e.g., for use with hotspots), or to implement machine-to-machine communications.

Certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDM access (OFDMA) techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106. The AP 104 and/or the STAs 106 may transmit data that is interleaved in accordance with the techniques described herein and/or receive and deinterleave data in accordance with the techniques described herein. For example, such data may be communicated via a 1 MHz MIMO-OFDM transmission.

Figure 2:
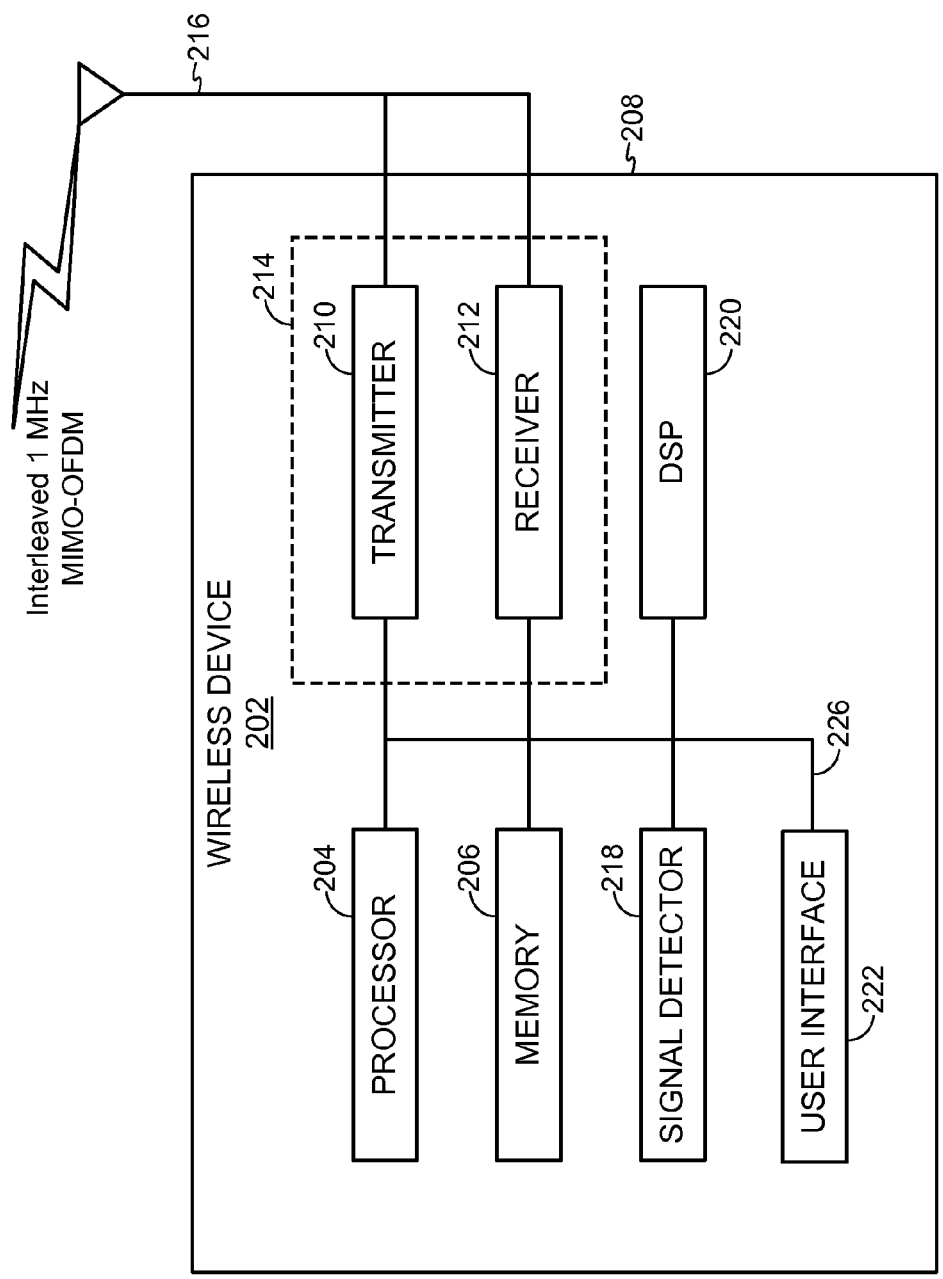
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may include the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may include a physical layer data unit (PPDU). In some aspects, the PPDU is referred to as a packet.

The wireless device 202 may further include a user interface 222 in some aspects. The user interface 222 may include a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As described above, the wireless device 202 may include an AP 104 or an STA 106, and may be used to transmit and/or receive communications. For example, the wireless device 202 may transmit data that is interleaved in accordance with the techniques described herein and/or receive and deinterleave data in accordance with the techniques described herein. For example, such data may be communicated via a 1 MHz MIMO-OFDM transmission. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to transmit data units with training fields with peak-to-power average ratio is as low as possible, as will be described in additional detail below. For ease of reference, the wireless device 202 configured with the components illustrated in FIG. 3 is hereinafter referred to as a wireless device 202a.

The wireless device 202a may include a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in codewords. In one aspect, the modulator 302 includes a QAM (quadrature amplitude modulation) modulator, for example a 16 QAM modulator or a 64 QAM modulator. In other aspects, the modulator 302 includes a binary phase-shift keying (BPSK) modulator or a quadrature phase-shift keying (QPSK) modulator.

The wireless device 202a may further include a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As described above, the DSP 220 may be configured to generate a data unit for transmission. In some aspects, the modulator 302 and the transform module 304 may be configured to generate a data unit including a plurality of fields including control information and a plurality of data symbols. The fields including the control information may include one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202a may further include a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmit processor.

The analog signal may be wirelessly transmitted by the transmitter 210. The analog signal may be further processed before being transmitted by the transmitter 210, for example by being filtered or by being upconverted to an intermediate or carrier frequency. In the aspect illustrated in FIG. 3, the transmitter 210 includes a transmit amplifier 308. Prior to being transmitted, the analog signal may be amplified by the transmit amplifier 308. In some aspects, the amplifier 308 includes a low noise amplifier (LNA).

The transmitter 210 is configured to transmit one or more packets or data units in a wireless signal based on the analog signal. The data units may be generated using the processor 204 and/or the DSP 220, for example using the modulator 302 and the transform module 304 as described above. Data units that may be generated and transmitted as described above are described in additional detail below with respect to FIGS. 5-29. The wireless device 202a may transmit data that is interleaved in accordance with the techniques described herein. For example, such data may be communicated via a 1 MHz MIMO-OFDM transmission.

FIG. 4 illustrates various components that may be utilized in the wireless device 202 to receive wireless communications. The components illustrated in FIG. 4 may be used, for example, to receive OFDM communications. In some aspects, the components illustrated in FIG. 4 are used to receive data units that include one or more training fields, as will be described in additional detail below. For example, the components illustrated in FIG. 4 may be used to receive data units transmitted by the components described above with respect to FIG. 3. For ease of reference, the wireless device 202 configured with the components illustrated in FIG. 4 is hereinafter referred to as a wireless device 202b. The wireless device 202b may receive and deinterleave data in accordance with the techniques described herein. For example, such data may be communicated via a 1 MHz MIMO-OFDM transmission.

The receiver 212 is configured to receive one or more packets or data units in a wireless signal. Data units that may be received and decoded or otherwise processed as described below are described in additional detail with respect to FIGS. 5-29.

In the aspect illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 includes an LNA.

The wireless device 202b may include an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202b may further include a transform module 404 configured to convert the representation the wireless signal into a frequency spectrum. In FIG. 4, the transform module 404 is illustrated as being implemented by a fast Fourier transform (FFT) module. In some aspects, the transform module 404 may identify a symbol for each point used by the transform module 404. For example, a 32 point size FFT module may identify 32 symbols.

The wireless device 202b may further include a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b may further include a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to codewords. In one aspect, the demodulator 406 includes a QAM (quadrature amplitude modulation) demodulator, for example a 16 QAM demodulator or a 64 QAM demodulator. In other aspects, the demodulator 406 includes a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As described above, the wireless signal received at the receiver 212 includes one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as described above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. The payload may be transmitted using one or more data symbols. The systems, methods, and devices herein may utilize data units with training fields whose peak-to-power ratio has been minimized.

When using OFDM, information using a number of orthogonal subcarriers of the frequency band being used. The number of subcarriers that are used may depend on a variety of considerations including the available frequency bands for use, bandwidth and any associated regulatory constraints. The number of subcarriers used is correlated to the size of an FFT module as each modulated subcarrier is an input to an IFFT module to create the OFDM signal to be transmitted. As such, in some implementations a larger FFT size (e.g., 64, 128, 256, 512) may, corresponding to transmitting data using more subcarriers, be desired to achieve a larger bandwidth. In other implementations, a smaller FFT size may be used for transmitting data in a narrow bandwidth. The number of subcarriers, and therefore FFT size, may be chosen so as to comply with regulatory domains with certain bandwidth restrictions. For example, an FFT size of 32 may be provided for certain implementations (e.g., for down clocked implementations), and provided for use for 802.11ah. As such, the wireless device 202a may include a several transform modules 304 implemented as an FFT or IFFT module, each of different sizes so as to comply with the number of subcarriers specified to be used. At least one of the transform modules 304 may be a 32 point size IFFT or FFT module according to certain aspects described herein.

Given lossy wireless communication mediums, various components may be included within a wireless communication device 200 to ensure that signals can be largely recovered correctly. One technique is the use of error correction. With error correction, when a bit or bits are lost, the bit or bits might be recovered using other bits that were not lost according to whatever error correction coding was done. As error correction may not be able to correct all errors, some error conditions might cause unrecoverable errors. For example, if four information bits are encoded into seven transmitted bits using a Reed-Solomon error correcting encoding, if any four of the seven transmitted bits are recovered, then the four information bits can be determined. However, if more than three of the transmitted bits are lost, the full information cannot be recovered. Note that if there are several such encodings, information is lost when four bits are lost if all four bits are lost out of one encoding, but if four bits are lost with two bits lost per encoding, the information is recoverable. One approach to spreading potential losses is interleaving.

Figure 5:
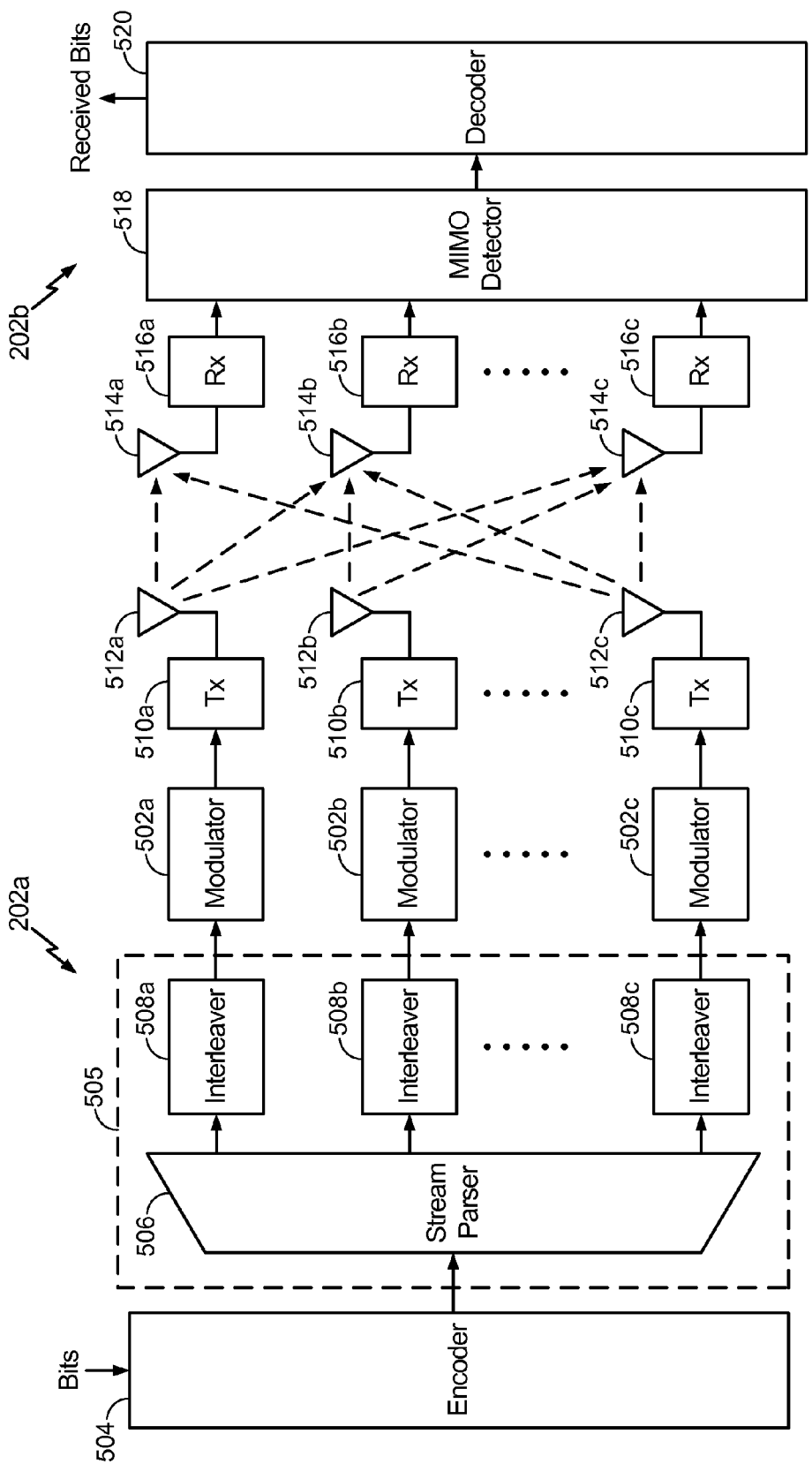
FIG. 5 is a functional block diagram of a MIMO system that may be implemented in wireless devices such as the wireless device of FIG. 2 to transmit and receive wireless communications.

FIG. 5 is a functional block diagram of a MIMO system that may be implemented in wireless devices, such as the wireless device 202 of FIG. 2, to transmit and receive wireless communications. Bits to be transmitted are provided to an encoder 504 of the wireless device 202a, which may apply a forward error correcting (FEC) code on a bit stream that is to be received at an output of the receiver 202b. The FEC code may be a block code, a convolutional code, or the like. The encoded bits are provided to an interleaving system 505 that distributes received input into M transmit streams.

The following abbreviations may be used below in conjunction with describing the interleaving system 505:

$N_{CBPS}$: Number of coded bits per symbol;
$N_{CBPSS}(i)$: Number of coded bits per symbol per the i-th spatial stream;
$N_{DBPS}$: Number of data bits per symbol;
$N_{BPSC}$: Number of coded bits per single carrier;
$N_{BPSCS}(i)$: Number of coded bits per single carrier for spatial stream i;
$N_{SS}$: Number of spatial streams;
$i_{SS}$: Spatial stream;
$N_{COL}$: Number of interleaver columns or Interleaving depth ($I_{DEPTH}$);
$N_{ROW}$: Number of interleaver rows; and
$D_n$: Shift in subcarriers for transmitter/spatial stream (TX).

The interleaving system 505 includes a stream parser 506 that parses an input bit stream from the encoder 504 to N spatial stream interleavers, designated 508a, 508b, and 508c. The parser may be provided with the number of spatial streams and parse bits on a round-robin basis. Other parsing functions may also be used. One parsing function that may be used is $k_n = N_{TX} * k + n$ (i.e., round-robin with one bit per spatial stream, then on to the next spatial stream where $k_n$ is the input bit index; and $N_{TX}$ is the number of transmitters/spatial streams). Another more general function f(k,n) might also be used, for example, sending two bits to a spatial stream, then moving on to the next spatial stream. Each stream interleaver 508a, 508b, and 508c may thereafter distribute bits so that errors may be recovered due to fading or other channel conditions. Hereinafter the stream interleavers 508a, 508b, and 508c may collectively be referred to an interleaver 508.

In one aspect, the interleaver 508 may be configured to perform frequency interleaving. The stream parser 505 may output blocks of $N_{CBPSS}(i_{SS})$ bits. Each block may then be interleaved by the interleaver 508 that writes to rows and reads out columns. The number of columns $N_{COL}$, or interleaver depth, may be chosen to optimize the ability to recover errors for the particular bandwidth and frequencies used. In one embodiment, 1 MHz OFDM-MIMO transmission may be used. Within 1 MHz, 32 orthogonal subcarriers may be available. In one aspect, out of the 32 possible subcarriers, 24 subcarriers (i.e., tones) may be used to transmit data while the remaining tones may be used for two pilot tones, a DC tone, and five guard tones. As such, the interleaver depth $N_{COL}$ may be optimized for 24 data tones according to various embodiments. In one aspect, the interleaver depth $N_{COL}$ may be chosen to be a factor of the number of data tones (i.e., a factor of 24). As such, in one embodiment of the disclosure, the $N_{COL}$ may be selected from the group of 4, 6, 8, and 12. The selected depth $N_{COL}$ may be chosen based on which depth provides the best frequency diversity over the 24 tones to be able to recover the message at the receiver 202b.

In one embodiment, the selected depth $N_{COL}$ may be six. For example, an interleaver depth of 6 may provide improved performance for a 1×1 MIMO configuration in certain cases, for example, when accounting for the packet error rate. However, other depths may also be used and provide other advantages.

In another embodiment, the selected depth $N_{COL}$ may be eight. For example, an interleaver depth of 8 may provide improved performance for a 1×1 MIMO configuration in certain cases, for example, when accounting for the packet error rate.

The interleaver 508 may receive coded bits in an input sequence from the encoder 504, where the coded bits have indices represent by k (i.e., the bits arrive as k=0, k=1, k=2, etc.). The interleaver may then reorder the bits so that the bits are output in order by index "j". Using this arrangement, adjacent bits may be separated such that the bits differ by several subcarriers. For QPSK or higher order constellations there may be 16 bits of difference within a given subcarrier. The interleaving may be defined using three permutations. The first permutation may be given by Equation 1.

$$i = N_{ROW}(k \bmod N_{COL}) + \mathrm{floor}(k/N_{COL}) k = 0, 1, \ldots, N_{CBPSS}(i_{SS}) - 1 \quad \text{Equ. 1.}$$

As described above, $N_{COL}$ may be selected from the group of 4, 6, 8, and 12 for 24 data tones. The second permutation may be given by Equation 2.

$$j = s(i_{SS}) \times \mathrm{floor}(i/s(i_{SS})) + (i + N_{CBPSS}(i_{SS}) - \mathrm{floor}(N_{COL} \times i / N_{BPSCS}(i_{SS}))) \bmod s(i_{SS}); i = 0, 1, \ldots, N_{CBPSS}(i_{SS}) - 1 \quad \text{Equ. 2}$$

The value of $s(i_{SS})$ may be determined by the number of coded bits per subcarrier. If more than one spatial stream exists (i.e., $N_{SS} > 1$), the interleaver 508 may perform frequency rotation in a third permutation. The frequency rotation may be applied after the second permutation as shown in Equation 3, where $i_{SS}$ is the index of the spatial stream on which the interleaver is operating and $N_{ROT}$ defines the base subcarrier rotation.

$$r = \left( j - \left( ((i_{SS} - 1) \times 2) \bmod 3 + 3 \times \mathrm{floor}\left(\frac{i_{SS}-1}{3}\right) \right) \times N_{ROT} \times N_{BPSCS}(i_{SS}) \right) \bmod N_{CBPSS}(i_{SS}); \quad \text{Equ. 3}$$

$$j = 0, 1, \ldots, N_{CBPSS}(i_{SS}) - 1$$

Frequency rotation may be defined where subcarrier rotation $D_n$ (i.e., coded data in the block where each interleaver begins) is a function of the base subcarrier rotation $N_{ROT}$ and interleaved rotation indexes "rot" as given by the equation $D_n = N_{ROT} \ast \mathrm{rot}$. This defines where in the matrix (made up of the rows and columns as described above) output from the second permutation each spatial stream begins for transmitting values on each available data tone and corresponding frequency.

In accordance with one embodiment, the values for base subcarrier rotation $N_{ROT}$ and rotation indexes rot may be determined for use with 1 MHz OFDM-MIMO transmission. The values may be optimized for 24 data tones to provide improved frequency diversity and to ensure that originally adjacent coded bits are interspersed both between spatial streams and frequency. For 24 data tones, the base subcarrier rotation $N_{ROT}$ may be the floor(24/4)=6, floor(24/5)=4, floor(24/3)=8 and so on. To be optimized for 24 data tones the rotation $N_{ROT}$ may be chosen from the group of values 2, 3, 4, 5, 6, 7, 8, and 9. In one embodiment, $N_{ROT}$ with a value of seven may provide improved performance in some cases, for example, when the number of spatial streams is greater than one. In another embodiment, $N_{ROT}$ with a value of two (2) may provide improved performance in some cases, for example, when the number of spatial streams is greater than one.

Assuming up to four spatial streams, the interleaved rotation indexes rot may be rot=[0 2 1 3] where each index corresponds to a different spatial stream. The rotation indexes may be determined to ensure that data within the block at which each interleaver starts to map to the corresponding data tones are separated by the maximum distance given a varying number of spatial streams. The indexes [0 2 1 3] may be determined by a bit reversal operation such that neighboring stream pairs (streams 1, 2, 3, and 4) are maximally separated in frequency. As such, if the $N_{ROT}$ is chosen to be 4, the interleaver 508 for the first spatial stream may map the bits corresponding to the first position of its block output by the second permutation to the first data tone according to the equation $D_n = N_{ROT} \ast \mathrm{rot}$ (i.e., 4*0). For a second spatial stream, assuming $N_{ROT}=4$, the subcarrier rotation would be 4*2 or 8. As such, the interleaver 508 for the second spatial stream may map the bits corresponding to the eighth position of its block to the first data tone for that spatial stream. For a third spatial stream, assuming $N_{ROT}=4$, the subcarrier rotation would be 4*1, or 4. As such the interleaver 508 for the third spatial stream may map the bits corresponding to the $4^{th}$ position of its block to the first data tone. Finally, the fourth spatial stream would map the bits corresponding to the $12^{th}$ position of the block to the first data tone.

As noted above, $N_{ROT}=2$ may provide improved performance in most cases when the number of spatial streams is greater than one and with $N_{COL}=8$. As such, the subcarrier rotation may be equal to 2*[0 2 1 3]. As such, if the $N_{ROT}$ is chosen to be 2, the interleaver 508 for the first spatial stream may map the bits corresponding to the first position of its block output by the second permutation to the first data tone according to the equation $D_n = N_{ROT} \ast \mathrm{rot}$ (i.e., 2*0). For a second spatial stream, assuming $N_{ROT}=2$, the subcarrier rotation would be 2*2 or 4. As such, the interleaver 508 for the second spatial stream may map the bits corresponding to the fourth position of its block to the first data tone for that spatial stream. For a third spatial stream, assuming $N_{ROT}=2$, the subcarrier rotation would be 2*1, or 2. As such, the interleaver 508 for the third spatial stream may map the bits corresponding to the $2^{nd}$ position of its block to the first data tone. Finally, the fourth spatial stream would map the bits corresponding to the $6^{th}$ position of the block to the first data tone.

Table 1 below may show, for example, advantages of using an $N_{ROT}=2$ as compared to an $N_{ROT}=4$ for different MIMO configurations and different modulation and coding schemes (MCS) where PER is the packet error rate.

TABLE 1

| | $N_{ROT}=2$ advantage over $N_{ROT}=4$ | | | | | | |
|---|---|---|---|---|---|---|---|
| | 2 × 2 MCS0 | 2 × 2 MCS1 | 2 × 2 MCS3 | 2 × 2 MCS5 | 4 × 4 MCS0 | 4 × 4 MCS1 | 4 × 4 MCS3 |
| At 1% PER | 0.4 dB | 0.55 dB | −0.15 dB | 0.75 dB | 0.25 dB | .2 dB | 0.2 dB |

According to the above, therefore, values for $N_{COL}$, $N_{ROT}$, and the rotation indexes rot may be determined for 1 MHz MIMO-OFDM transmission for use with 24 data tones. Various considerations may be used to determine which values to select. For example, the considerations may include the packet length (e.g., 256 bytes), the MIMO configuration (e.g., 1×1, 2×2 2ss, and 4×4 4ss), the type of channel, or the modulation and coding scheme (e.g., BPSK ½, QPSK ½, 16 QAM ½, 64 QAM ⅔, 256 QAM ¾). FIGS. 6-24 show examples of simulations of the performance for various selections of $N_{COL}$ and $N_{ROT}$ with plots showing the signal-to-noise ratio (SNR) versus the packet error rate (PER). As shown by the FIGS. 6-24, a $N_{COL}=8$ and a $N_{ROT}=2$ may provide improved performance when the number of spatial streams is greater than one. In some embodiments, a $N_{COL}=6$ may provide improved performance for a MIMO 1×1 configuration.

Figure 6:
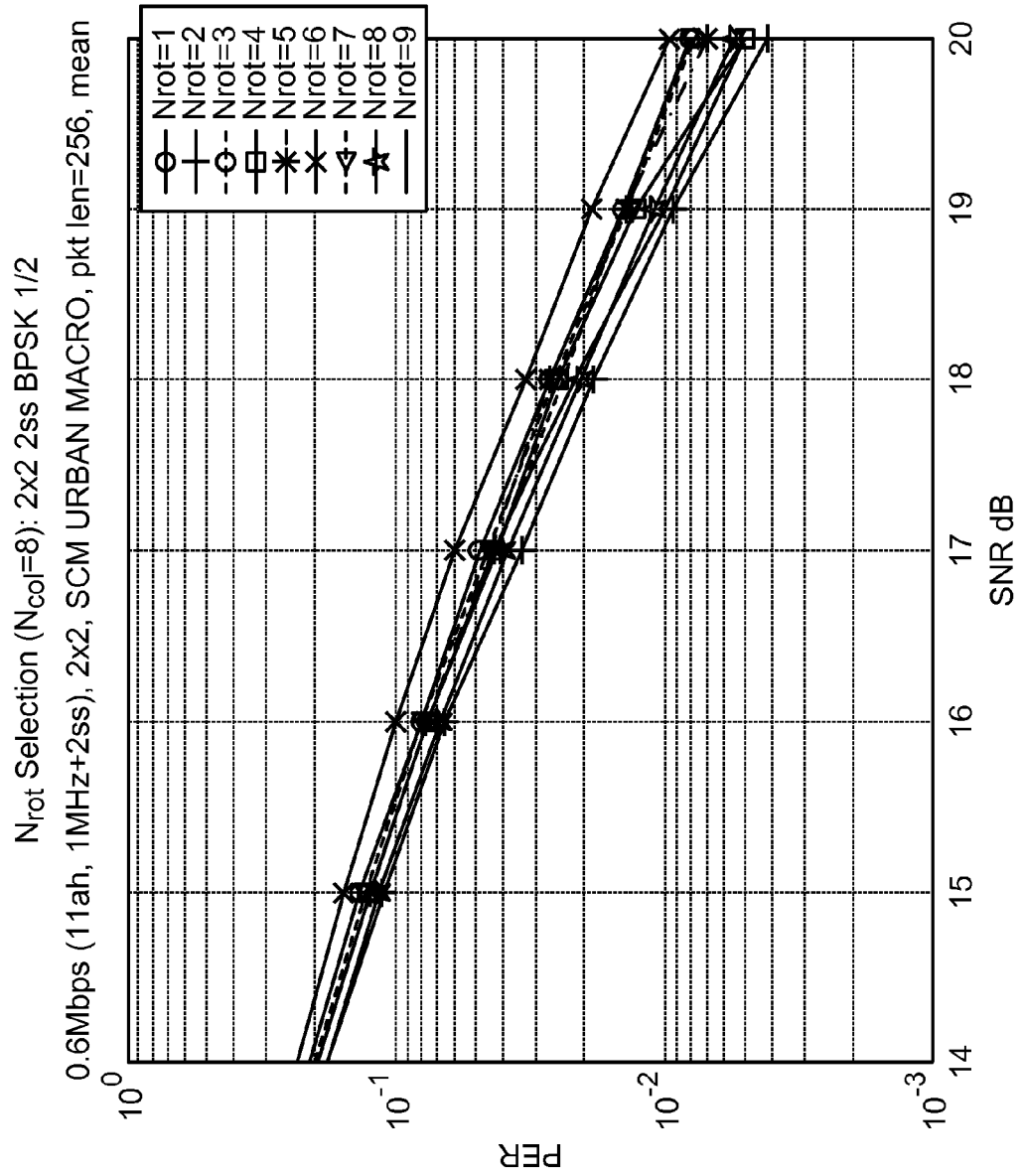
FIG. 6 is a plot showing exemplary performance results for different $N_{ROT}$ values for a 2×2 MIMO configuration using a BPSK ½ modulation scheme.

FIG. 6 is a plot showing exemplary performance results for different $N_{ROT}$ values for a 2×2 MIMO configuration using a BPSK ½ modulation scheme when $N_{COL}=8$. As shown in FIG. 6, $N_{ROT}=2$ may provide improved performance as compared to other values for $N_{ROT}$ and better than $N_{ROT}=4$ by about 0.4 dB at 1% PER.

Figure 7:
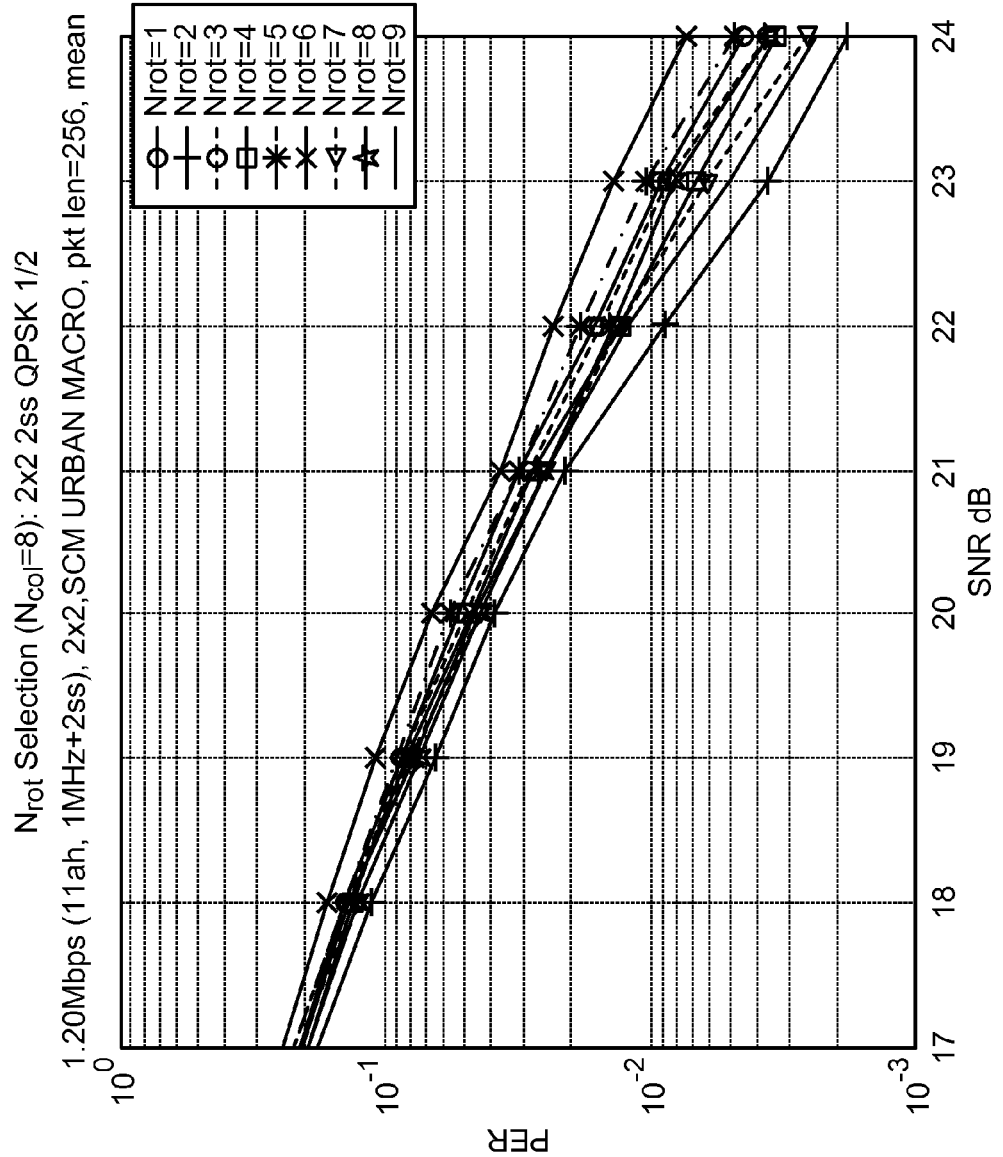
FIG. 7 is a plot showing exemplary performance results for different $N_{ROT}$ values for a 2×2 MIMO configuration using a QPSK ½ modulation scheme.

FIG. 7 is a plot showing exemplary performance results for different $N_{ROT}$ values for a 2×2 MIMO configuration using a QPSK ½ modulation scheme where $N_{COL}=8$. As shown in FIG. 7, $N_{ROT}=2$ may provide improved performance as compared to other values for $N_{ROT}$ and better than $N_{ROT}=4$ by about 0.55 dB at 1% PER.

Figure 8:
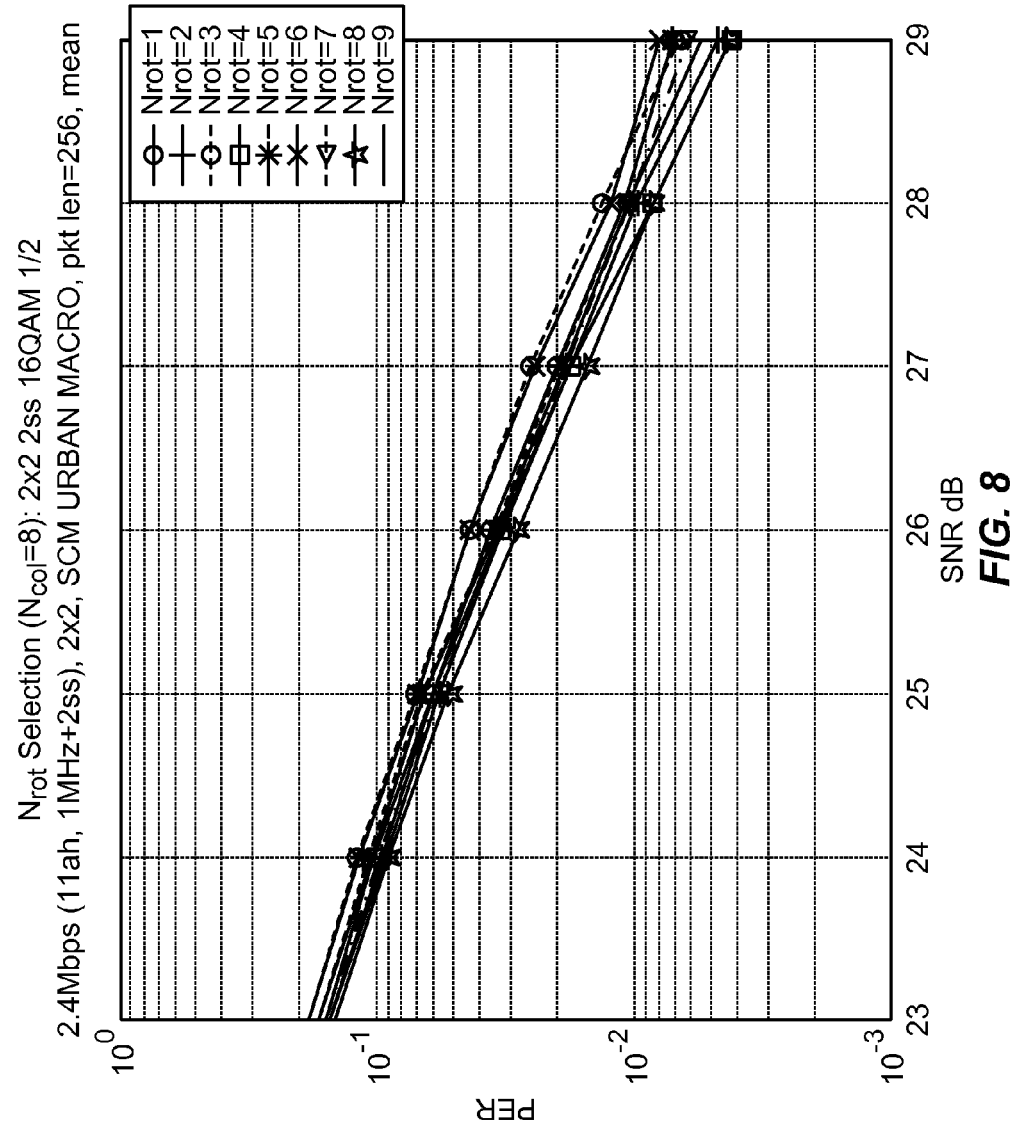
FIG. 8 is a plot showing exemplary performance results for different $N_{ROT}$ values for a 2×2 MIMO configuration using a 16 QAM ½ modulation scheme.

FIG. 8 is a plot showing exemplary performance results for different $N_{ROT}$ values for a 2×2 MIMO configuration using a 16 QAM ½ modulation scheme for $N_{COL}=8$. As shown in FIG. 8, $N_{ROT}=8$ may provide improved performance as compared to other values for $N_{ROT}$ and better than $N_{ROT}=4$ by about 0.05 dB at 1% PER and better than $N_{ROT}=2$ by about 0.2 dB at 1% PER.

Figure 9:
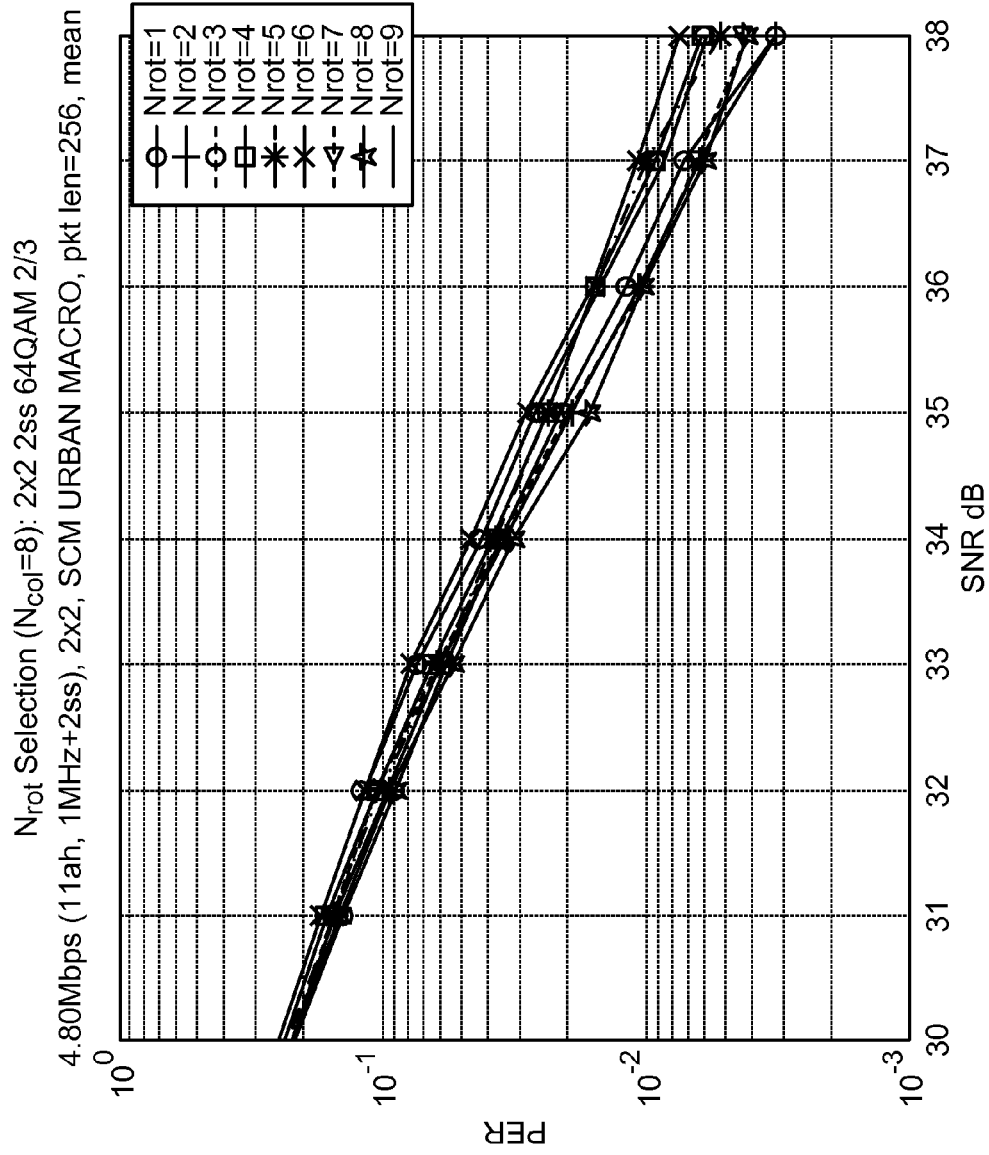
FIG. 9 is a plot showing exemplary performance results for different $N_{ROT}$ values for a 2×2 MIMO configuration using a 64 QAM ⅔ modulation scheme.

FIG. 9 is a plot showing exemplary performance results for different $N_{ROT}$ values for a 2×2 MIMO configuration using a 64 QAM ⅔ modulation scheme with $N_{COL}=8$. As shown in FIG. 9, $N_{ROT}=8$ may provide improved performance as compared to other values for $N_{ROT}$ and better than $N_{ROT}=4$ by about 0.8 dB at 1% PER and better than $N_{ROT}=2$ by about 0.05 dB at 1% PER.

Figure 10:
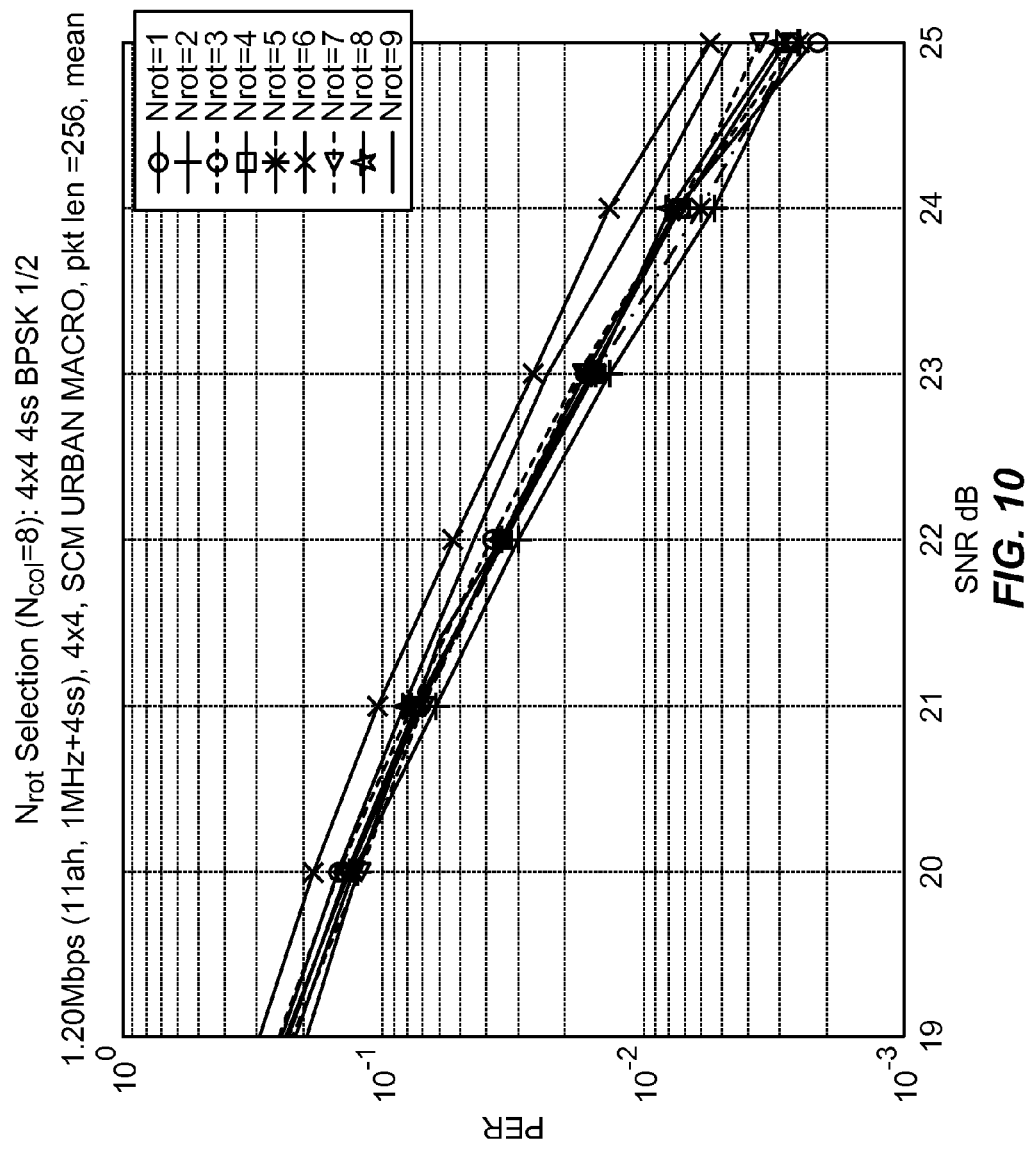
FIG. 10 is a plot showing exemplary performance results for different $N_{ROT}$ values for a 4×4 MIMO configuration (4 spatial streams) using a BPSK ½ modulation scheme.

FIG. 10 is a plot showing exemplary performance results for different $N_{ROT}$ values for a 4×4 MIMO configuration (4 spatial streams) using a BPSK ½ modulation scheme when $N_{COL}=8$. As shown in FIG. 10, $N_{ROT}=2$ may provide improved performance as compared to other values for $N_{ROT}$ and better than $N_{ROT}=4$ by about 0.25 dB at 1% PER.

Figure 11:
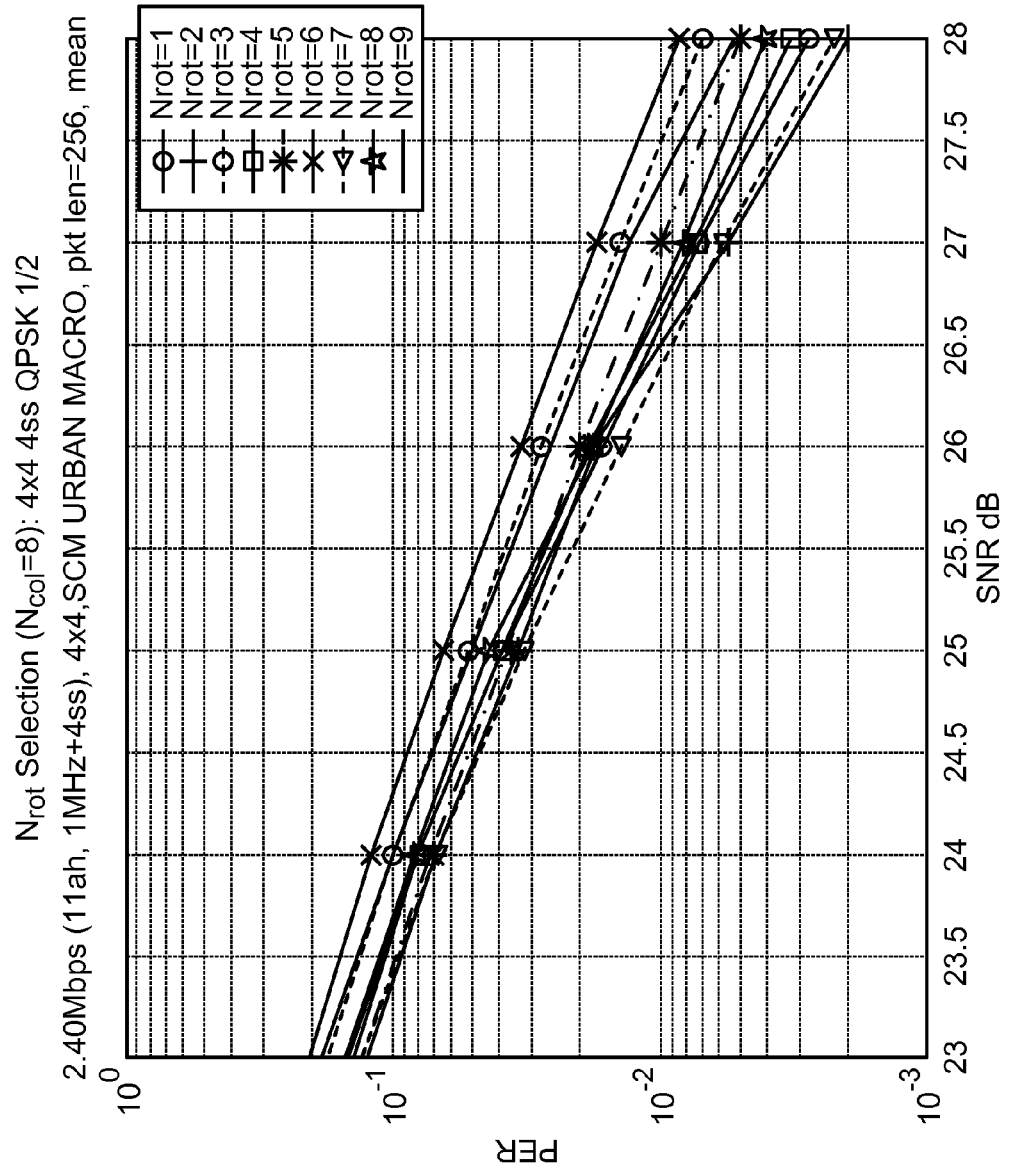
FIG. 11 is a plot showing exemplary performance results for different $N_{ROT}$ values for a 4×4 MIMO configuration using a QPSK ½ modulation scheme.

FIG. 11 is a plot showing exemplary performance results for different $N_{ROT}$ values for a 4×4 MIMO configuration using a QPSK ½ modulation scheme where $N_{COL}=8$. As shown in FIG. 11, $N_{ROT}=7$ may provide improved performance as compared to other values for $N_{ROT}$ and better than $N_{ROT}=4$ by about 0.3 dB at 1% PER and better than $N_{ROT}=2$ by about 0.1 dB at 1% PER.

Figure 12:
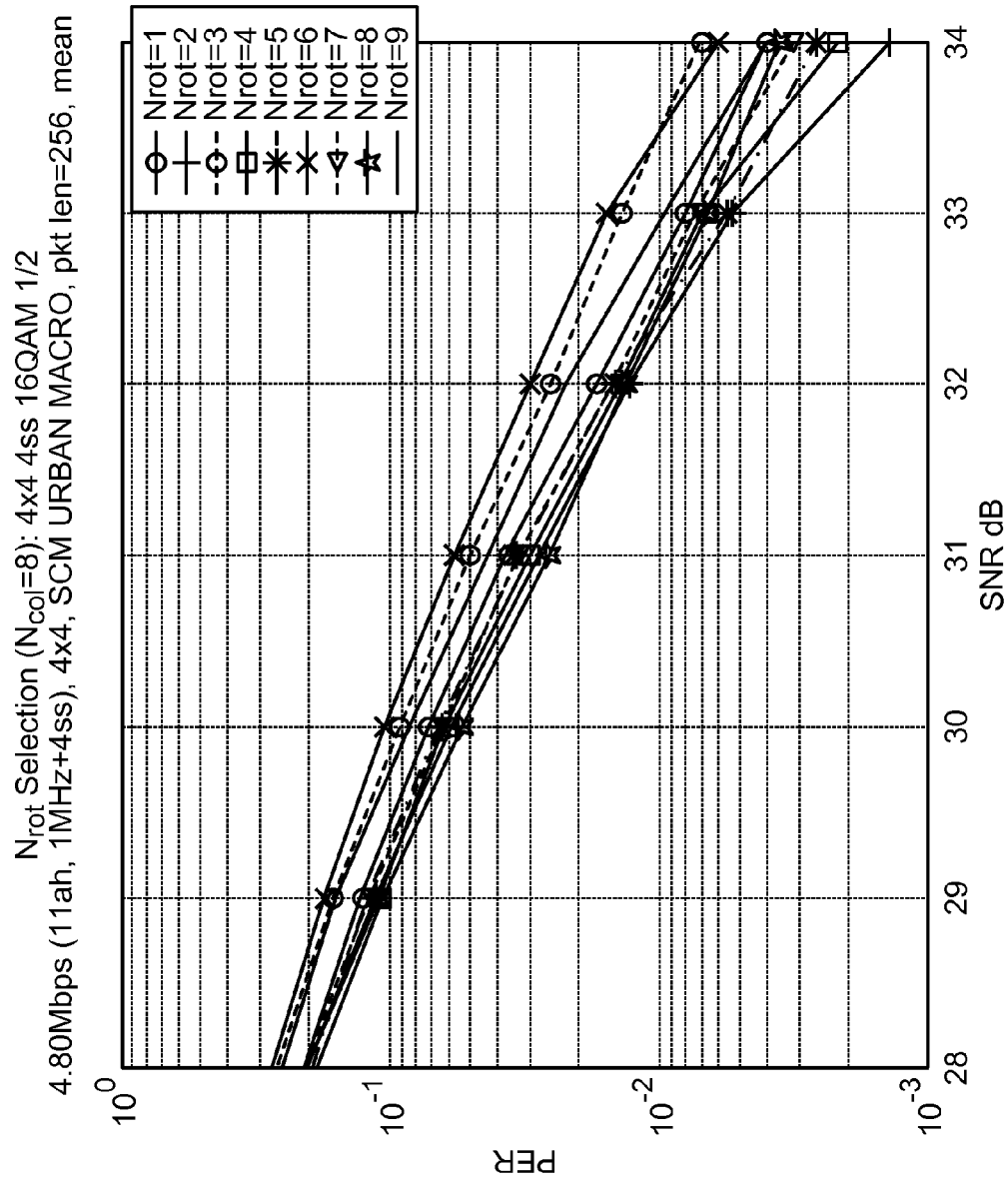
FIG. 12 is a plot showing exemplary performance results for different $N_{ROT}$ values for a 4×4 MIMO configuration using a 16 QAM ½ modulation scheme.

FIG. 12 is a plot showing exemplary performance results for different $N_{ROT}$ values for a 4×4 MIMO configuration using a 16 QAM ½ modulation scheme for $N_{COL}=8$. As shown in FIG. 12, $N_{ROT}=2$ may provide improved performance as compared to other values for $N_{ROT}$ and better than $N_{ROT}=4$ by about 0.2 dB at 1% PER.

Figure 13:
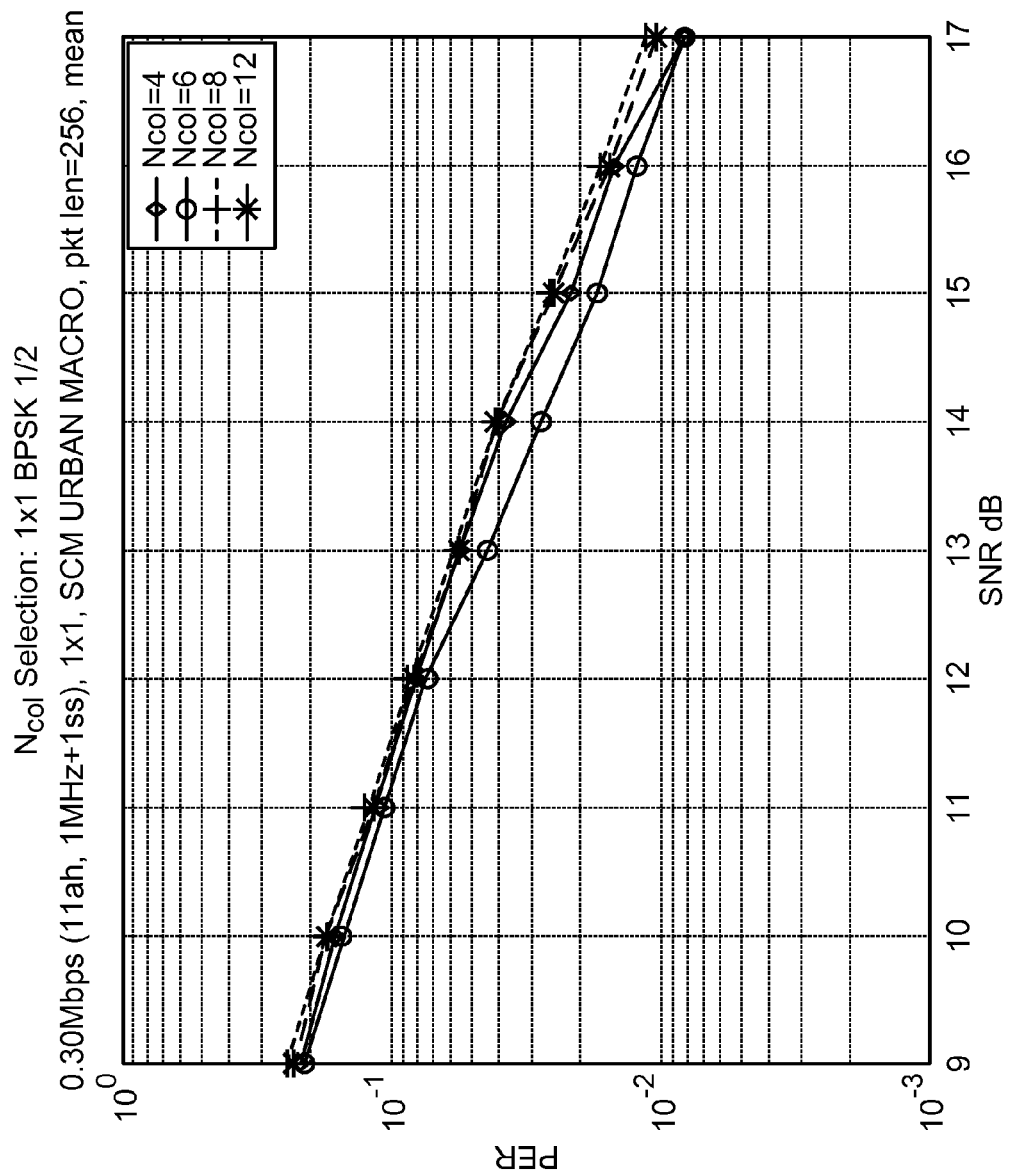
FIG. 13 is a plot showing exemplary performance results for different $N_{COL}$ values for a 1×1 MIMO configuration using a BPSK ½ modulation scheme.

FIG. 13 is a plot showing exemplary performance results for different $N_{COL}$ values for a 1×1 MIMO configuration using a BPSK ½ modulation scheme. As shown in FIG. 13, in some cases, $N_{COL}=6$ may provide improved performance as compared to other values for $N_{COL}$.

Figure 14:
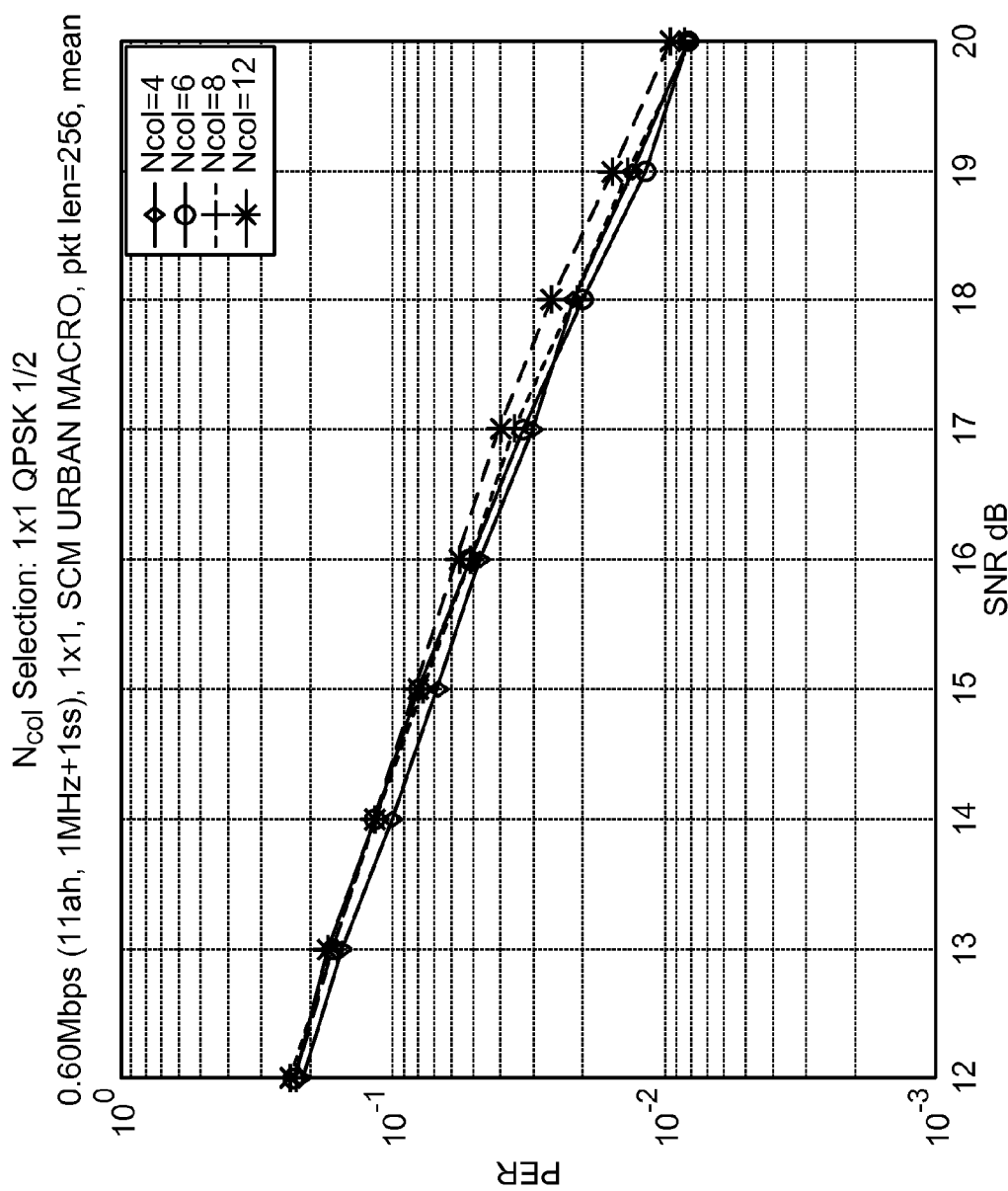
FIG. 14 is a plot showing exemplary performance results for different $N_{COL}$ values for a 1×1 MIMO configuration using a QPSK ½ modulation scheme.

FIG. 14 is a plot showing exemplary performance results for different $N_{COL}$ values for a 1×1 MIMO configuration using a QPSK ½ modulation scheme. As shown in FIG. 14, in some cases, $N_{COL}=6$ may provide improved performance for 1% PER while $N_{COL}=4$ may provide improved performance at 10% PER.

Figure 15:
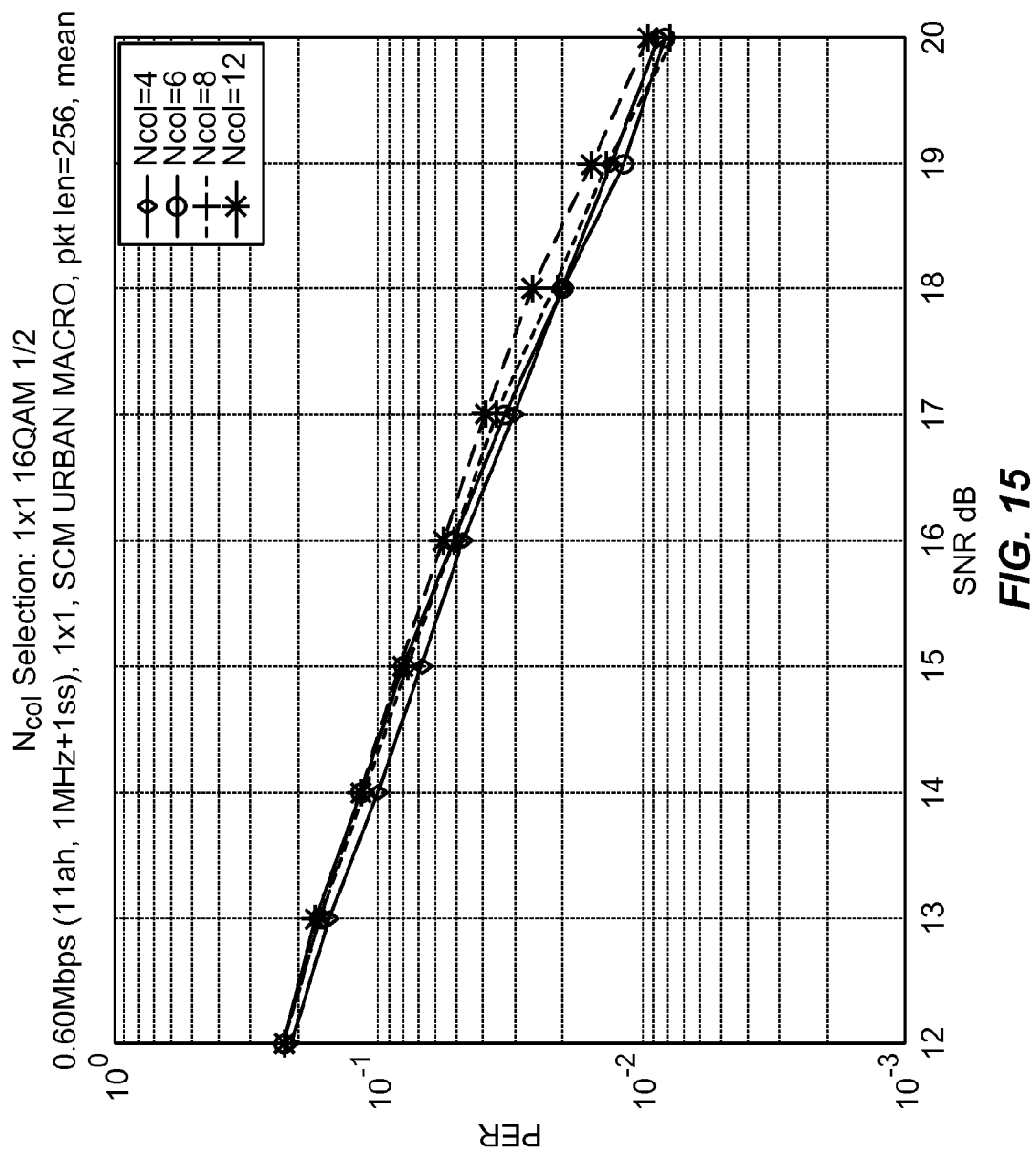
FIG. 15 is a plot showing exemplary performance results for different $N_{COL}$ values for a 1×1 MIMO configuration using a 16 QAM ½ modulation scheme.

FIG. 15 is a plot showing exemplary performance results for different $N_{COL}$ values for a 1×1 MIMO configuration using a 16 QAM ½ modulation scheme. As shown in FIG. 15, in some cases, $N_{COL}=6$ may provide improved performance as compared to other values for $N_{COL}$.

Figure 16:
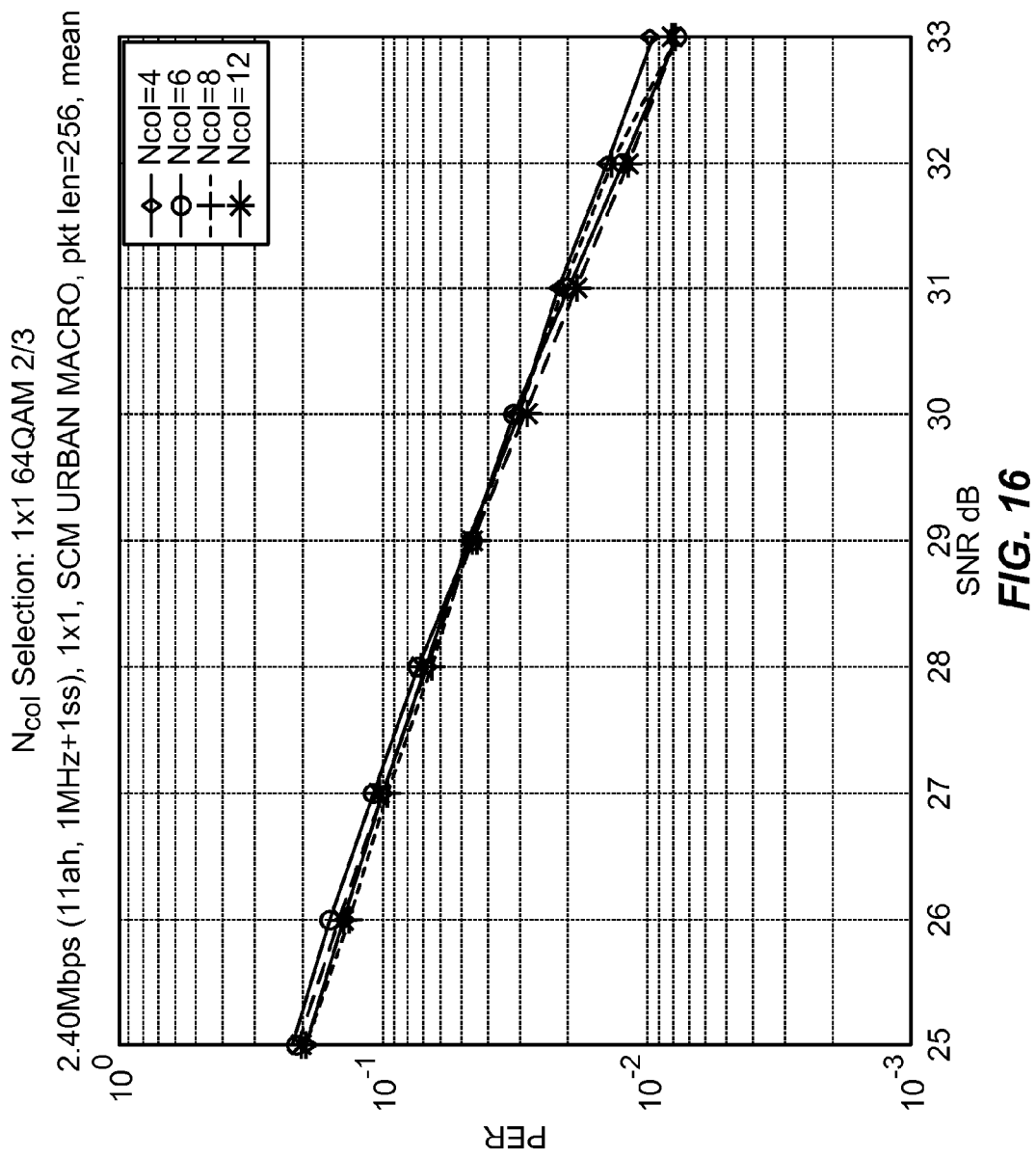
FIG. 16 is a plot showing exemplary performance results for different $N_{COL}$ values for a 1×1 MIMO configuration using a 64 QAM ⅔ modulation scheme.

FIG. 16 is a plot showing exemplary performance results for different $N_{COL}$ values for a 1×1 MIMO configuration using a 64 QAM ⅔ modulation scheme. As shown in FIG. 16, in some cases, $N_{COL}=6$ and $N_{COL}=12$ may provide improved performance at 1% PER as compared to other values for $N_{COL}$.

Figure 17:
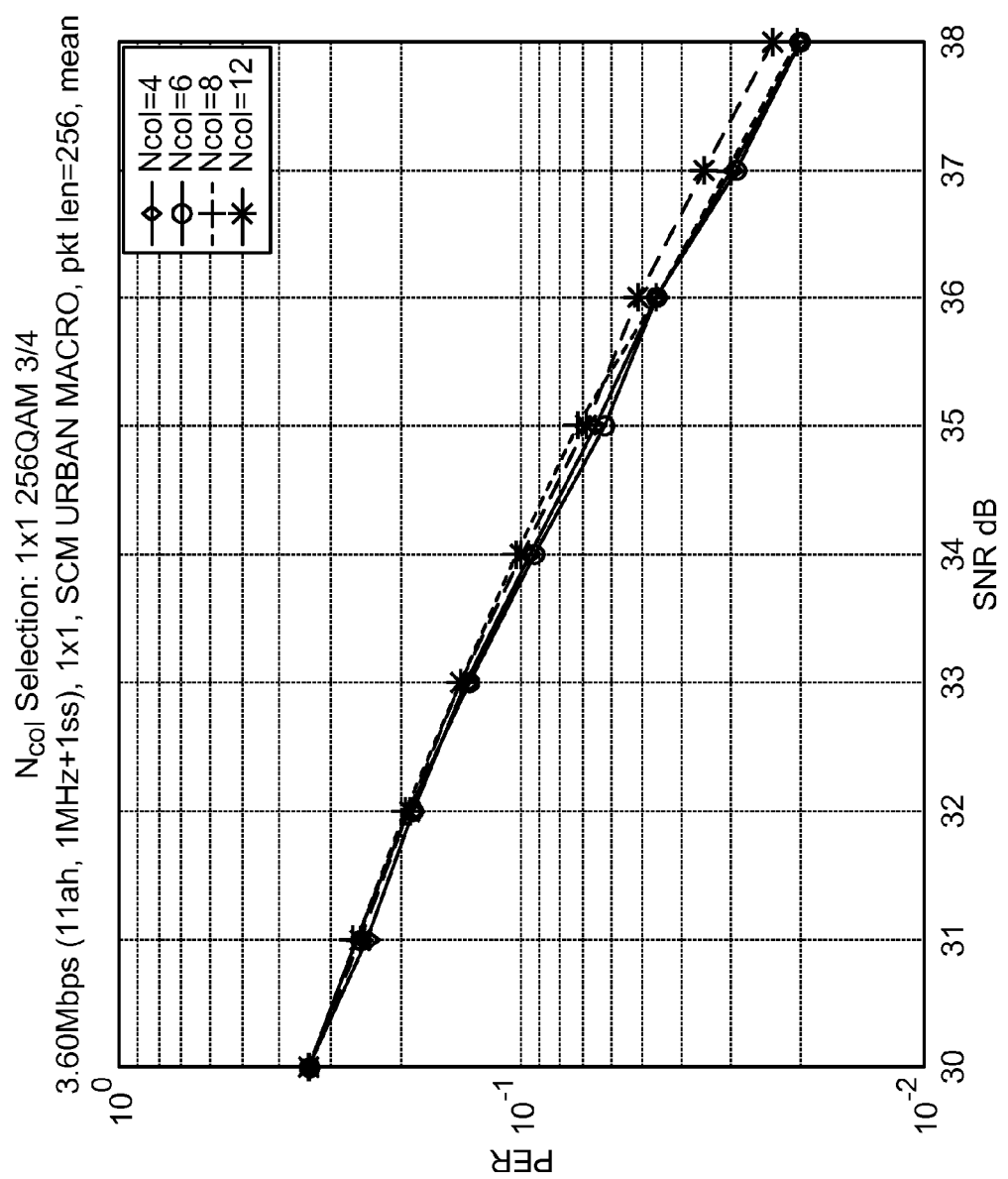
FIG. 17 is a plot showing exemplary performance results for different $N_{COL}$ values for a 1×1 MIMO configuration using a 256 QAM ¾ modulation scheme.

FIG. 17 is a plot showing exemplary performance results for different $N_{COL}$ values for a 1×1 MIMO configuration using a 256 QAM ¾ modulation scheme. As shown in FIG. 17, in some cases, $N_{COL}=6$ and $N_{COL}=4$ may provide improved performance as compared to other values for $N_{COL}$. As such, $N_{COL}=6$ may provide improved performance in some cases.

Figure 18:
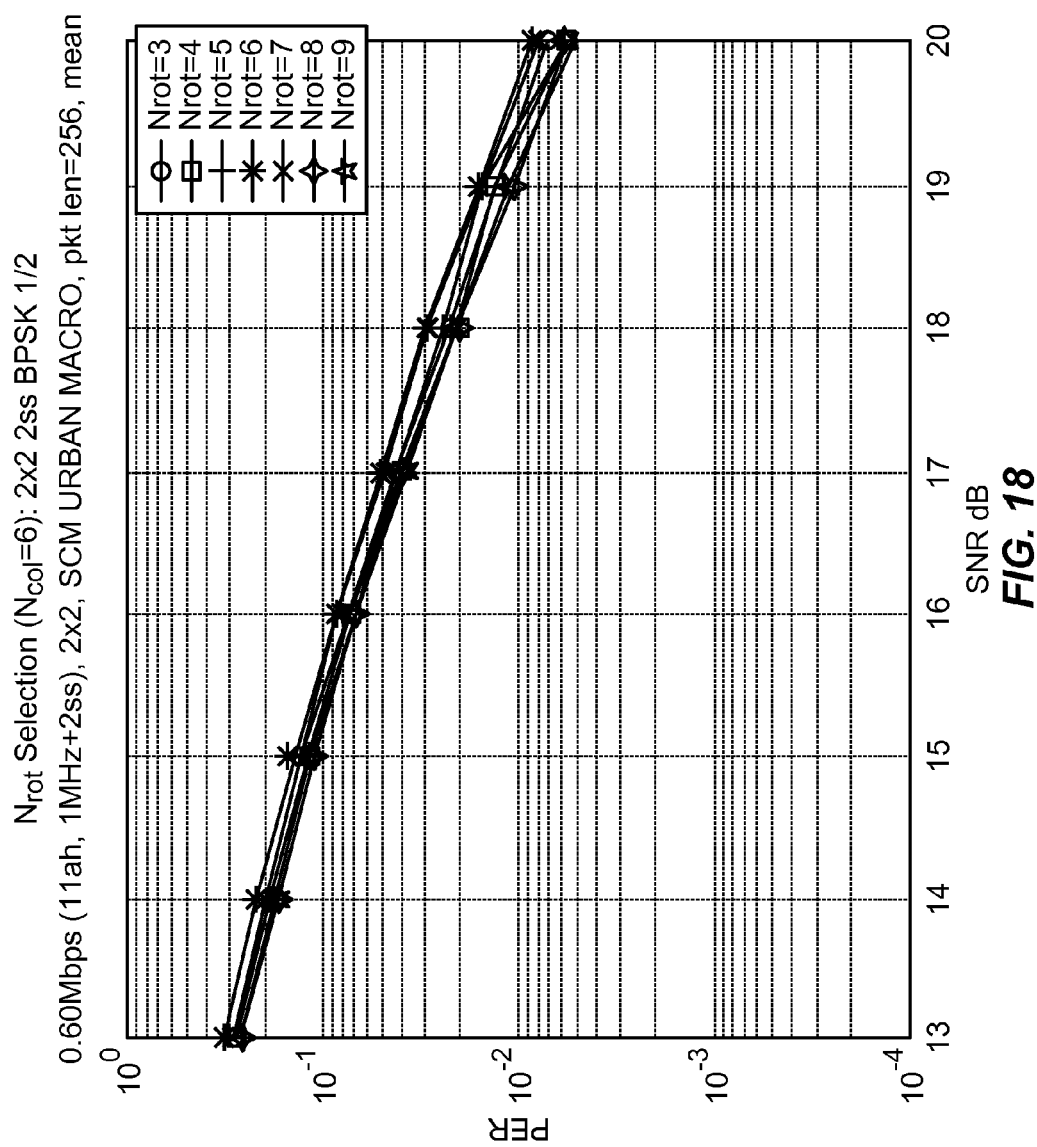
FIG. 18 is a plot showing exemplary performance results for different $N_{ROT}$ values for a 2×2 2ss MIMO configuration using a BPSK ½ modulation scheme.

FIG. 18 is a plot showing exemplary performance results for different $N_{ROT}$ values for a 2×2 2ss MIMO configuration using a BPSK ½ modulation scheme. As shown in FIG. 18, in some cases, $N_{ROT}=8$ and $N_{ROT}=9$ may provide improved performance as compared to other values for $N_{ROT}$.

Figure 19:
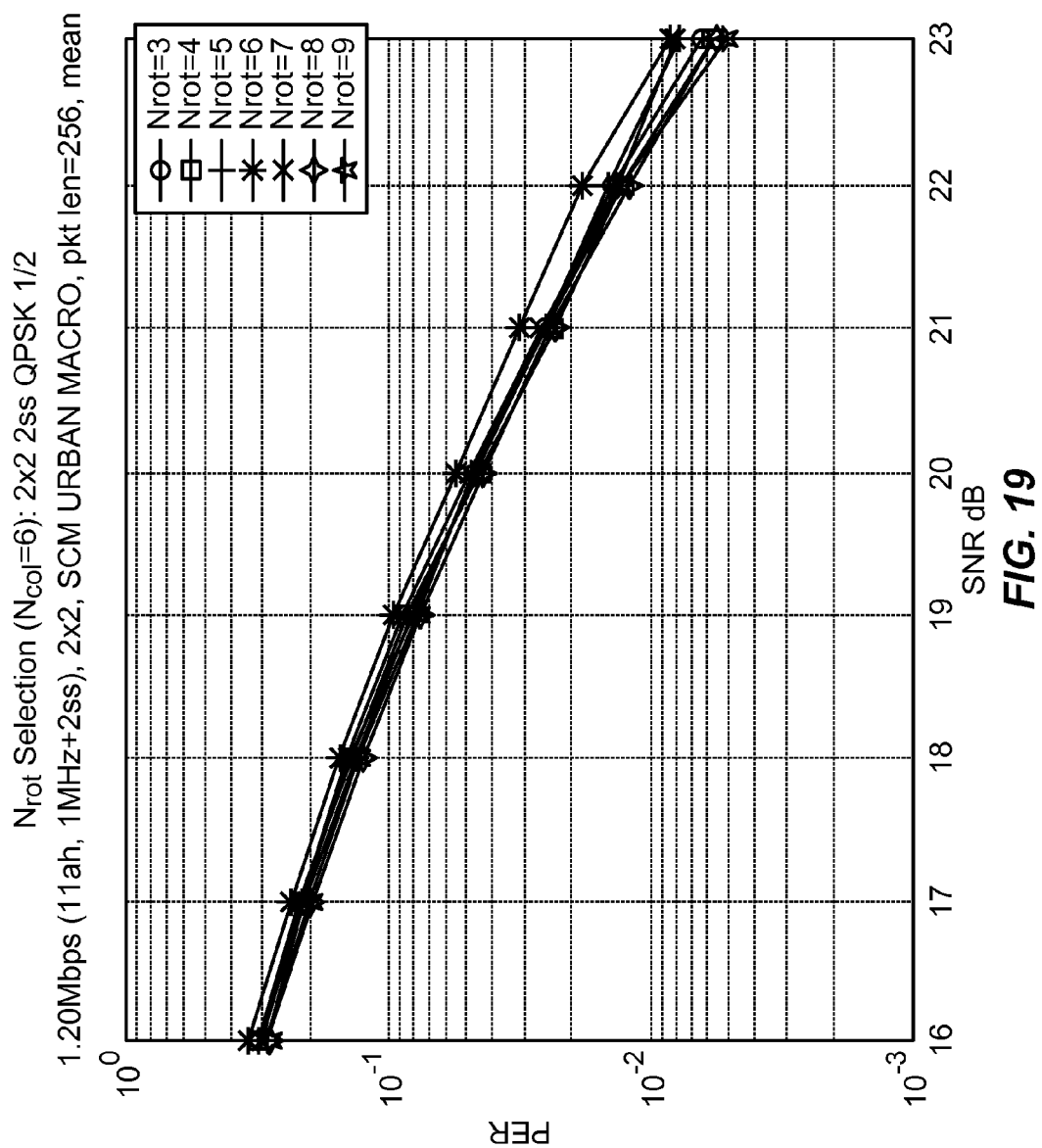
FIG. 19 is a plot showing exemplary performance results for different $N_{ROT}$ values for a 2×2 2ss MIMO configuration using a QPSK ½ modulation scheme.

FIG. 19 is a plot showing exemplary performance results for different $N_{ROT}$ values for a 2×2 2ss MIMO configuration using a QPSK ½ modulation scheme. As shown in FIG. 19, in some cases $N_{ROT}=8$ may provide improved performance as compared to other values for $N_{ROT}$.

Figure 20:
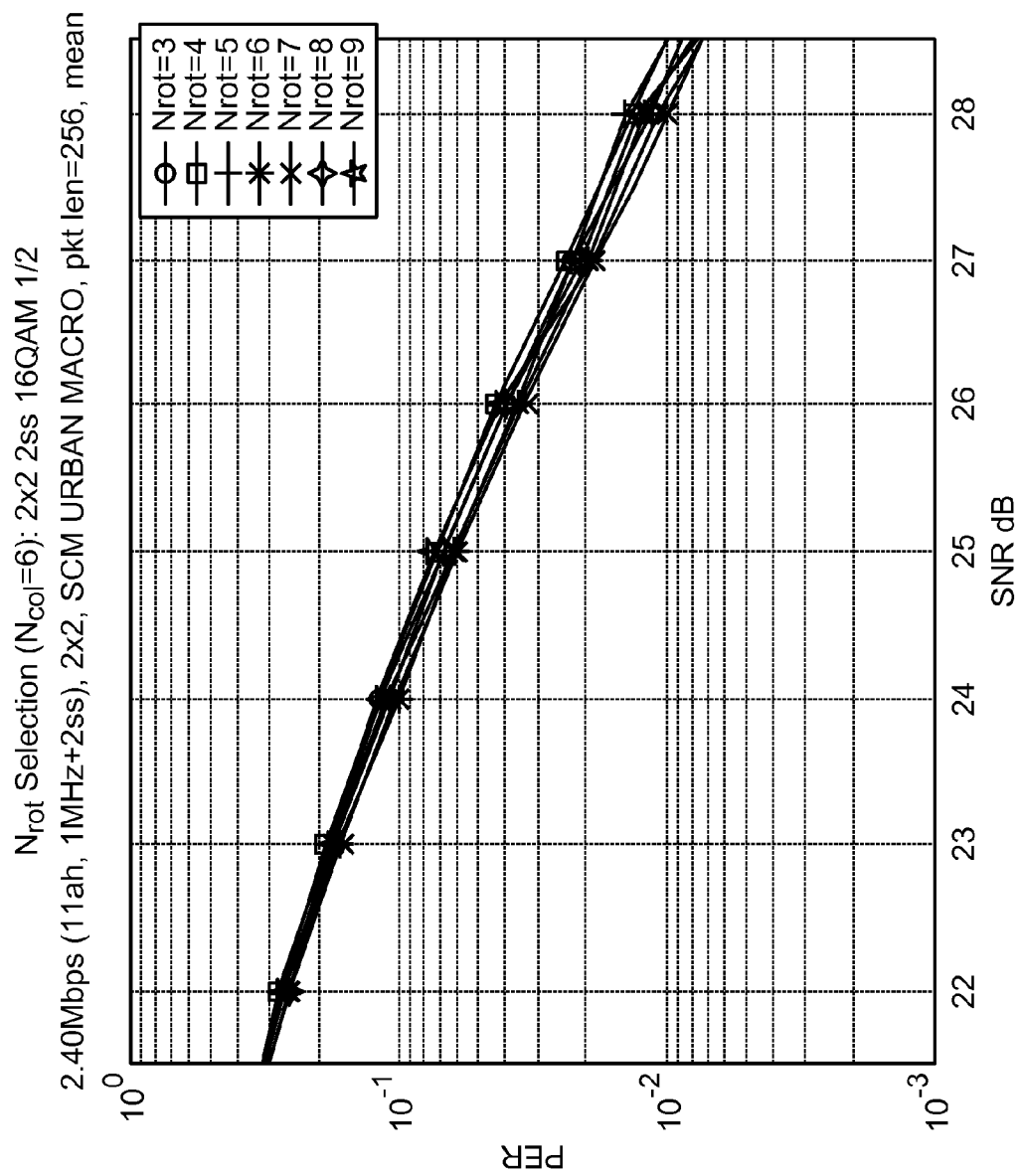
FIG. 20 is a plot showing exemplary performance results for different $N_{ROT}$ values for a 2×2 2ss MIMO configuration using a 16 QAM ½ modulation scheme.

FIG. 20 is a plot showing exemplary performance results for different $N_{ROT}$ values for a 2×2 2ss MIMO configuration using a 16 QAM ½ modulation scheme. As shown in FIG. 20, in some cases, $N_{ROT}=7$ may provide improved performance as compared to other values for $N_{ROT}$.

Figure 21:
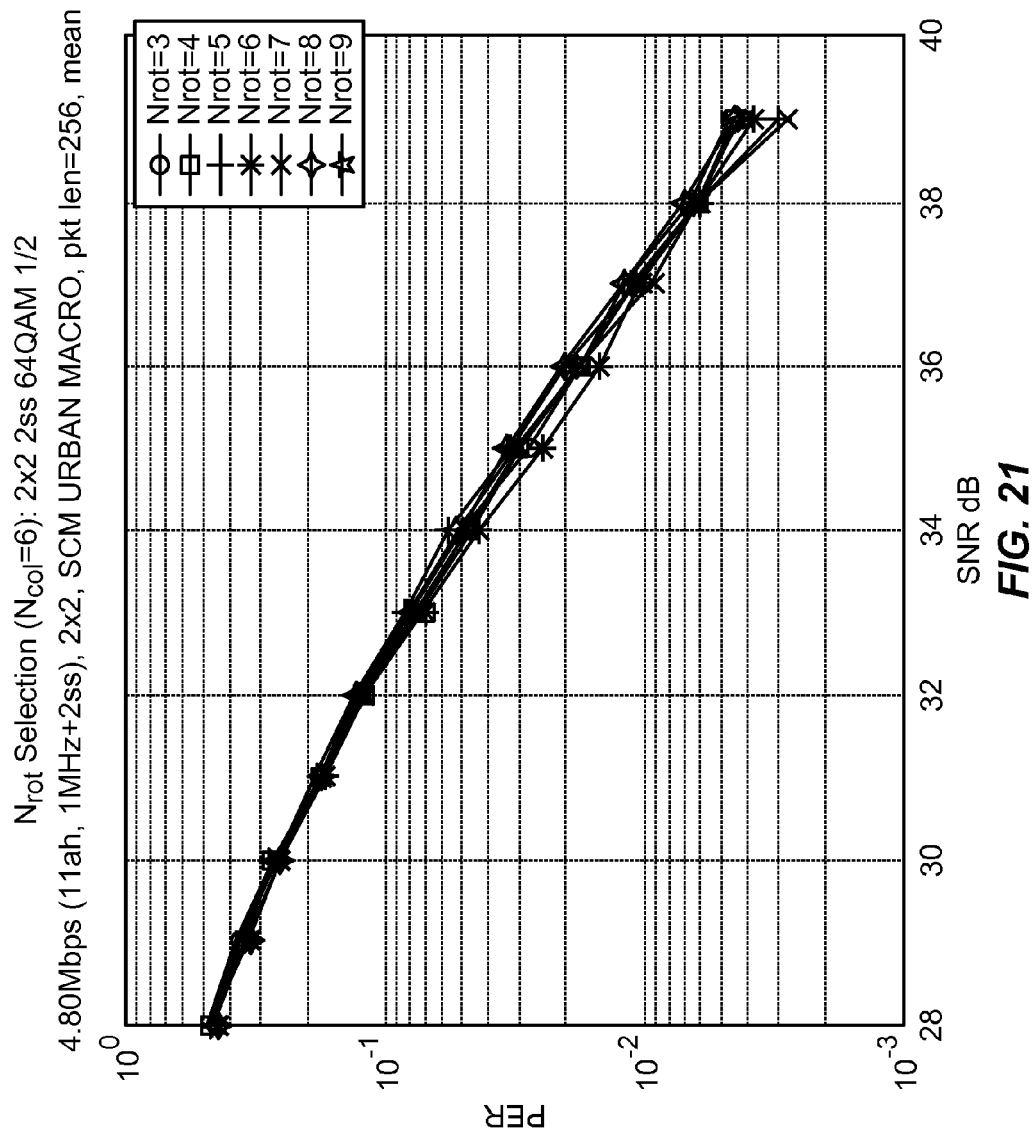
FIG. 21 is a plot showing exemplary performance results for different $N_{ROT}$ values for a 2×2 2ss MIMO configuration using a 64 QAM ⅔ modulation scheme.

FIG. 21 is a plot showing exemplary performance results for different $N_{ROT}$ values for a 2×2 2ss MIMO configuration using a 64 QAM ⅔ modulation scheme. As shown in FIG. 21, in some cases, $N_{ROT}=7$ may provide improved performance at 1% PER as compared to other values for $N_{ROT}$.

Figure 22:
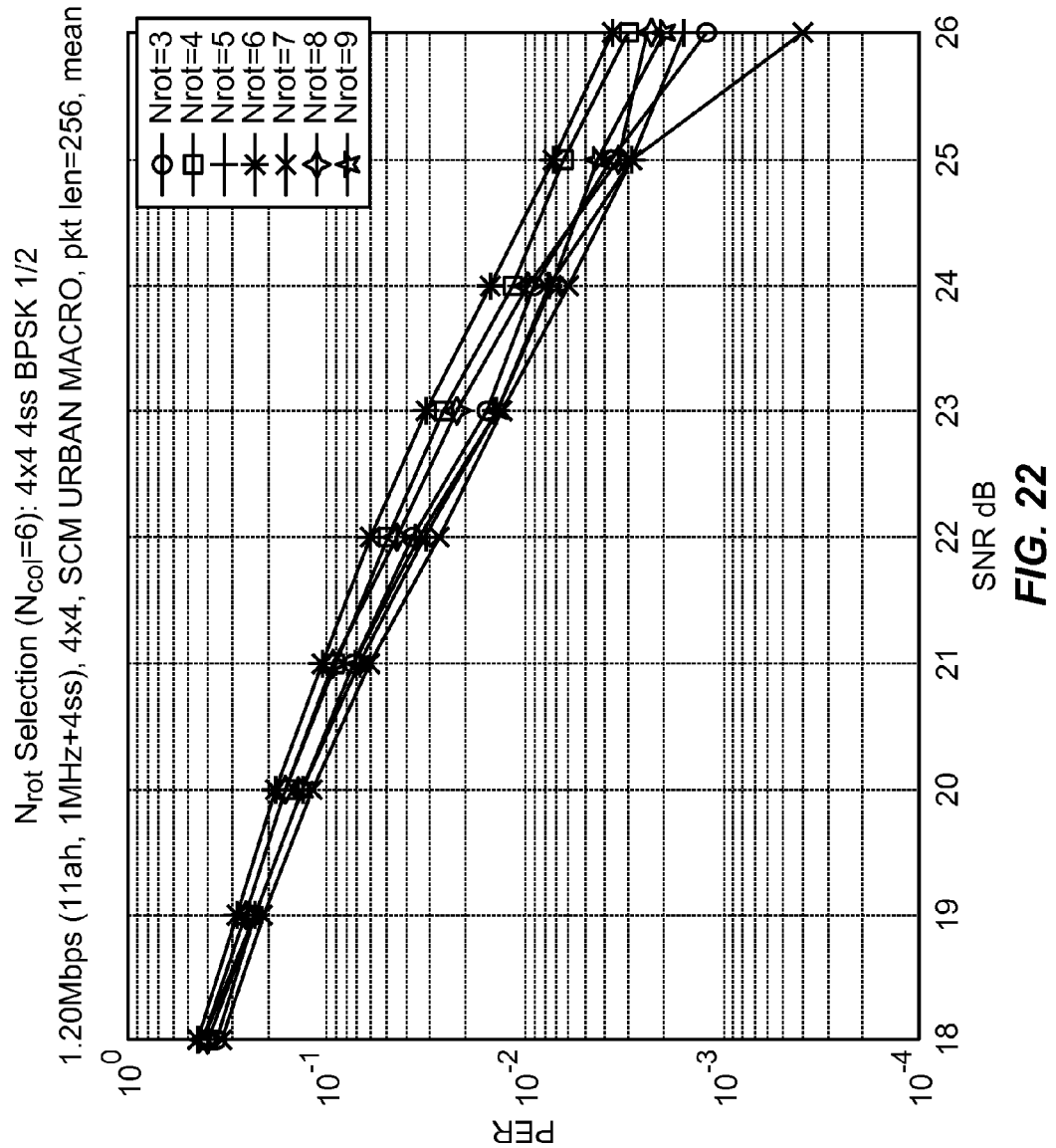
FIG. 22 is a plot showing exemplary performance results for different $N_{ROT}$ values for a 4×4 4ss MIMO configuration using a BPSK ½ modulation scheme.

FIG. 22 is a plot showing exemplary performance results for different $N_{ROT}$ values for a 4×4 4ss MIMO configuration using a BPSK ½ modulation scheme. As shown in FIG. 22, in some cases, $N_{ROT}=7$ may provide improved performance as compared to other values for $N_{ROT}$.

Figure 23:
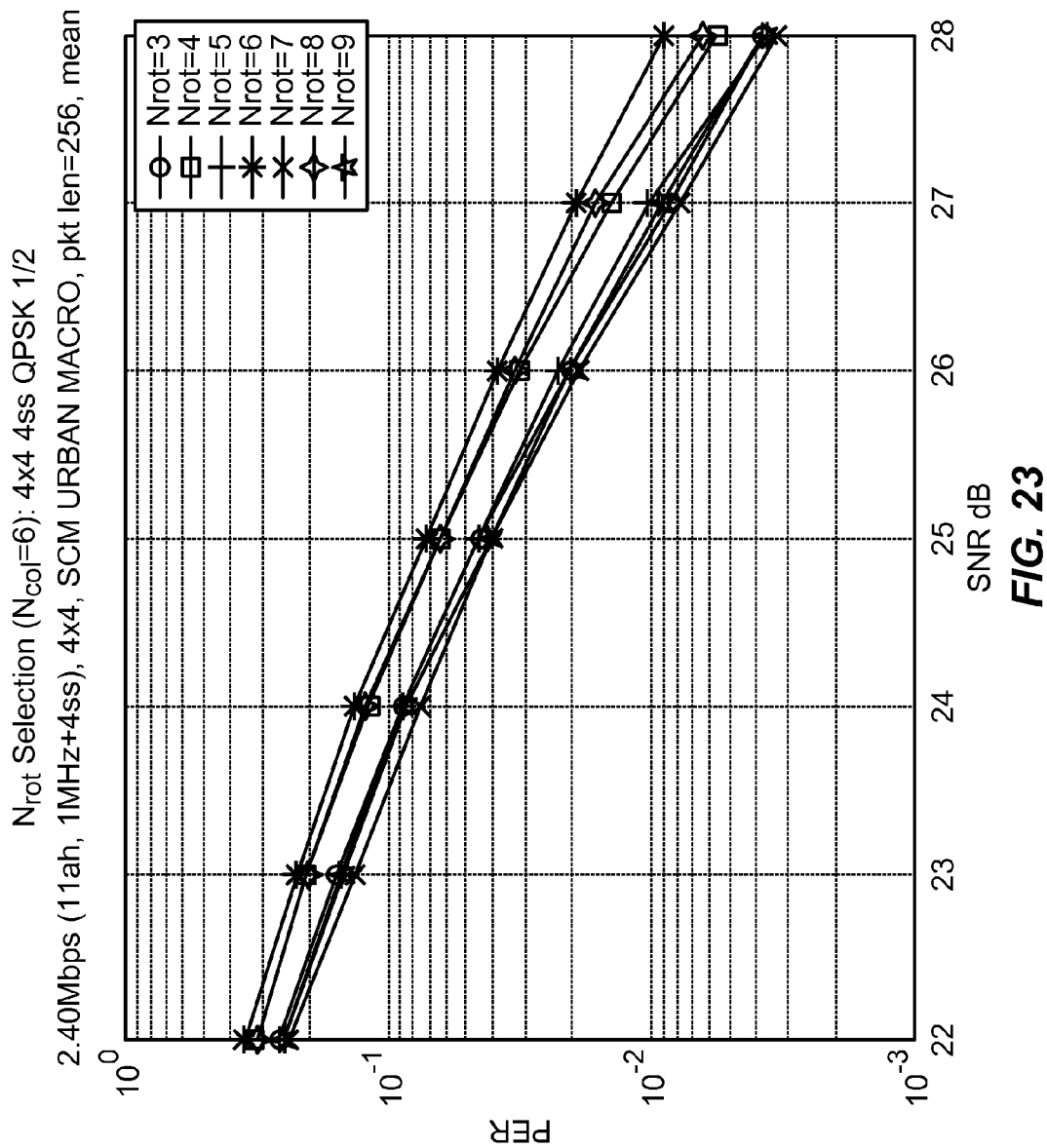
FIG. 23 is a plot showing exemplary performance results for different $N_{ROT}$ values for a 4×4 4ss MIMO configuration using a QPSK ½ modulation scheme.

FIG. 23 is a plot showing exemplary performance results for different $N_{ROT}$ values for a 4×4 4ss MIMO configuration using a QPSK ½ modulation scheme. As shown in FIG. 23, in some cases, $N_{ROT}=7$ may provide improved performance as compared to other values for $N_{ROT}$.

Figure 24:
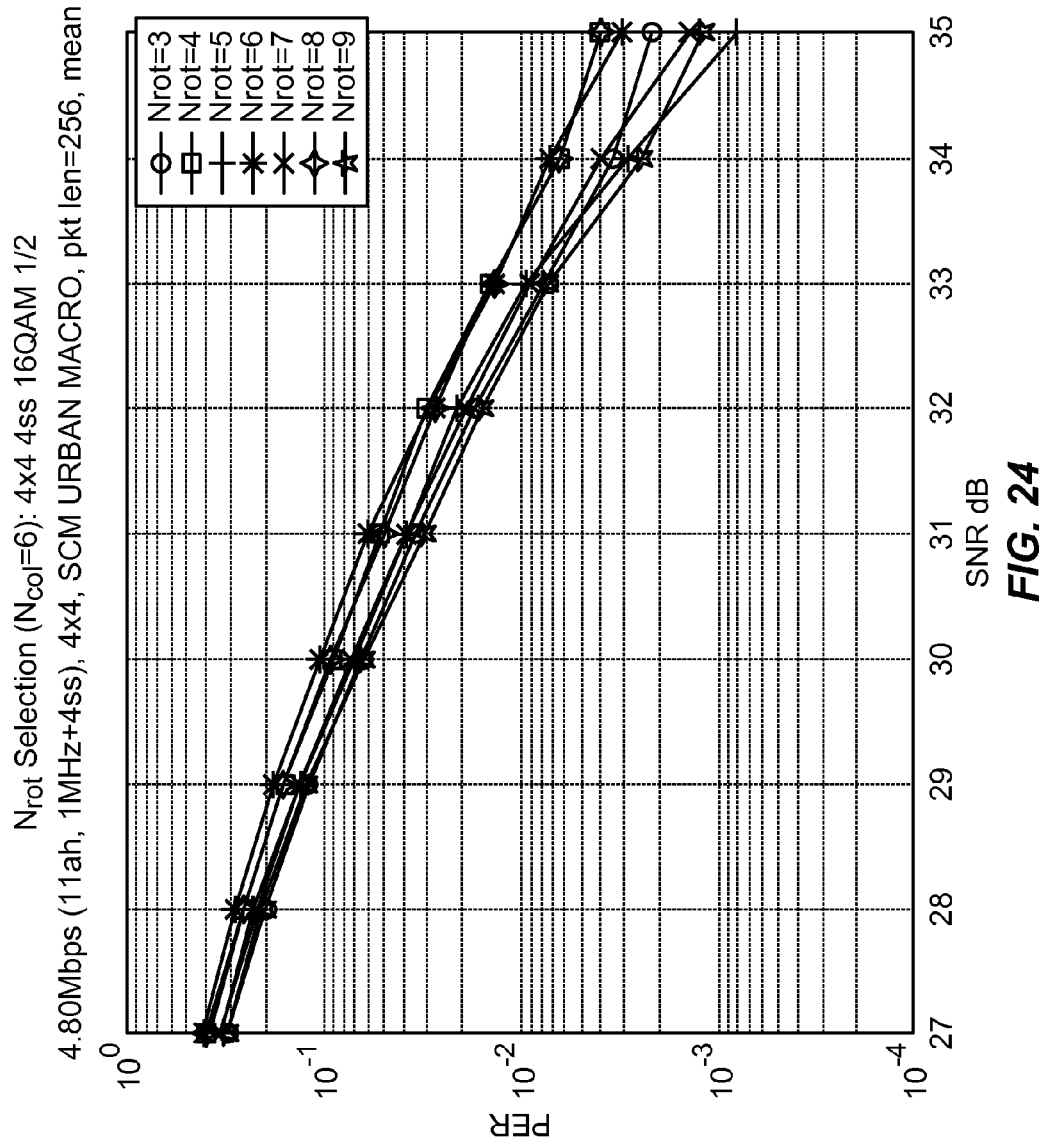
FIG. 24 is a plot showing exemplary performance results for different $N_{ROT}$ values for a 4×4 4ss MIMO configuration using a 16 QAM ½ modulation scheme.

FIG. 24 is a plot showing exemplary performance results for different $N_{ROT}$ values for a 4×4 4ss MIMO configuration using a 16 QAM ½ modulation scheme. As shown in FIG. 24, in some cases, $N_{ROT}=9$ may provide improved performance as compared to other values for $N_{ROT}$. The difference between $N_{ROT}=7$ and $N_{ROT}=9$ may be less than or equal to 0.3 dB. Accordingly, $N_{ROT}=7$ may provide improved performance in some cases.

As shown by FIGS. 6-24, an $N_{ROT}$ of two may provide improved overall performance in some cases where $N_{COL}$ is eight and the number of spatial streams is greater than one. In some embodiments, an $N_{ROT}=7$ may provide improved performance in some cases where $N_{COL}$ has been chosen as 6.

Referring to FIG. 5, each transmit stream may then be modulated by a modulator 502a, 502b, or 502c and passed to a transmission circuit 510a, 510b, or 510c that transmits the modulated transmit stream using antennas 512a, 512b, or 512c, into a wireless radio space using a frequency band, such as 1 MHz and others used for 802.11 transmissions. The bits may be modulated using QPSK (Quaternary Phase Shift Keying) modulation, BPSK (mapping one bit at a time), 16 QAM, and the like.

In some embodiments, antennas 512a, 512b, and 512c are distinct and spatially separated antennas. In other embodiments, distinct signals might be combined into different polarizations off of fewer than M antennas. An example of this is where spatial rotation or spatial spreading is done, where multiple spatial streams are mapped on a single antenna. In any case, it should be understood that distinct spatial streams can be organized in different manners. For example, a transmit antenna might carry data from more than one spatial stream or several transmit antennas might carry data from a spatial stream. For example, consider the case of a transmitter with four transmit antennas and two spatial streams. Each spatial stream can be mapped onto two transmit antennas in that case, so two antennas are carrying data from just one spatial stream.

The receiver 202b receives signals from channel(s) at N antennas 514a, 514b, and 514c (counting separate polarizations, as appropriate) coupled to N receive circuits 516a, 516b, and 516c. The outputs of receive circuits 516a, 516b, and 516c are provided to a MIMO detector 518, which provides its output to a decoder 520, which in turn outputs the received bits which, without unrecoverable errors, are the same as the transmitted bits input to encoder 504. The MIMO detector 134 may presumably have the appropriate deinterleaver (not shown). The deinterleaver (not shown) may use operations to perform the reverse operation as described above. For example, the deinterleaver may include one or more stream deinterleavers.

Figure 25:
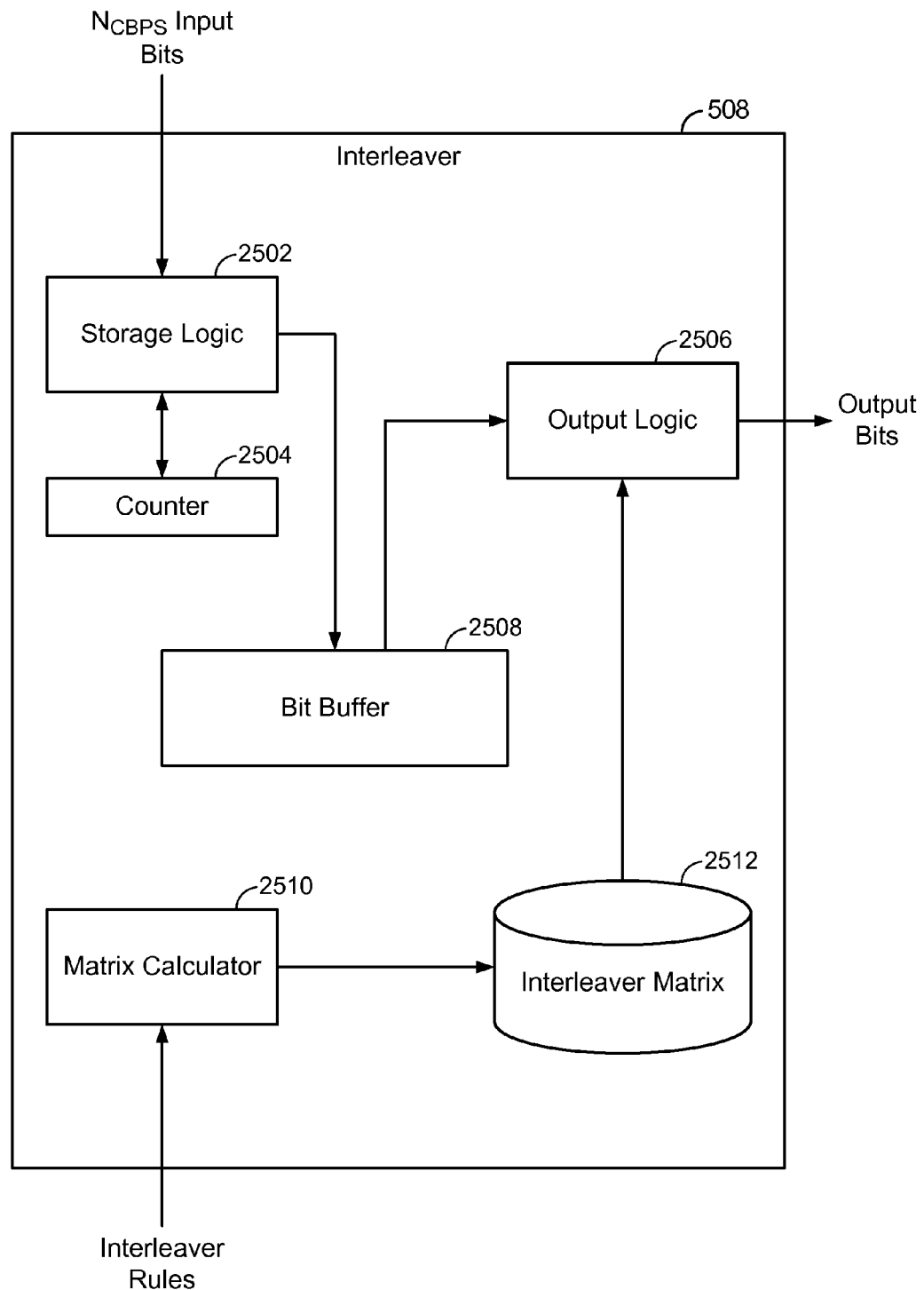
FIG. 25 shows a functional block diagram of an exemplary interleaver of FIG. 5.

FIG. 25 shows a functional block diagram of an exemplary embodiment of the interleaver 508 of FIG. 5. It should be appreciated that the multiple stream interleavers 508a, 508b, and 508c may be combined into a combined structure. As shown, input bits may be received and storage logic 2502 may place the bits in a bit buffer 2508. The locations of the bit buffer 2508 in which the bits are placed may be dictated by a counter 2504 and may typically be such that bits are stored sequentially in the bit buffer 2508. Output logic 2506 may read out bits from the bit buffer 2508 and output the bits for transmission. The order in which the bits are read out is determined by the implementation of the interleaver 508, as described above. The equations shown above may be calculated at each bit, but in some implementations indices may be calculated all at once and stored in a data structure such as a matrix mapping input indices to output indices. Such data might be generated using a matrix calculator 2510 that stores the results in an interleaver matrix 2512 for use by the output logic 2506.

Figure 26:
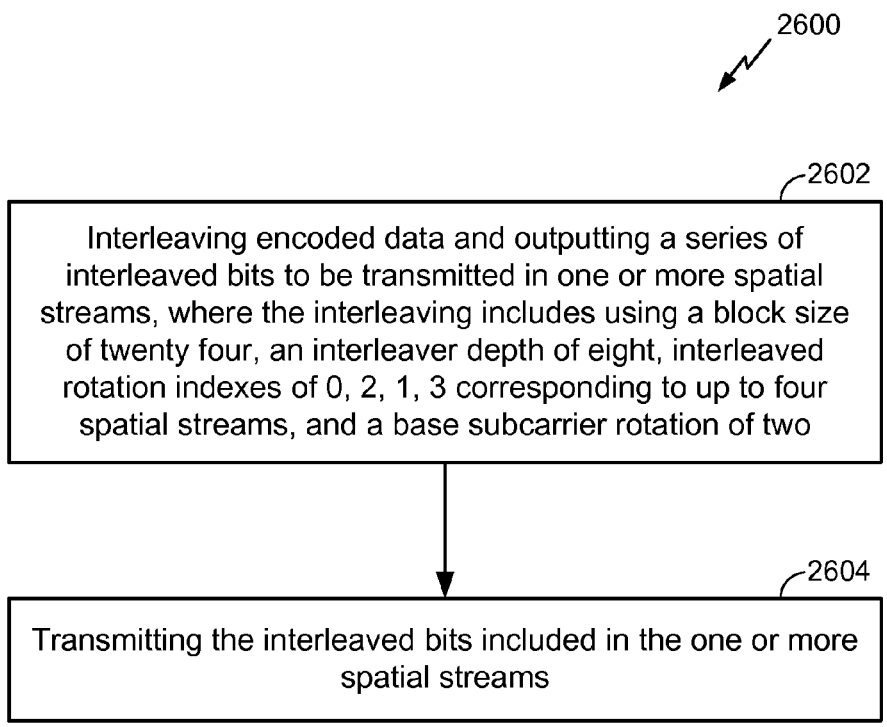
FIG. 26 shows a flow chart of an exemplary method of interleaving and transmitting a data unit.

FIG. 26 shows a flowchart of exemplary method of interleaving a bit stream for transmission using 1 MHz MIMO-OFDM and is generally designated 2600. In block 2602, the method includes interleaving encoded data and outputting a series of interleaved bits to be transmitted in one or more spatial streams. The interleaving may use a block size of twenty four, an interleaver depth of eight, interleaved rotation indexes of 0, 2, 1, 3 corresponding to up to four spatial streams, and a base subcarrier rotation of two. In block 2604, the method further includes transmitting the interleaved bits included in the one or more spatial streams.

Figure 27:
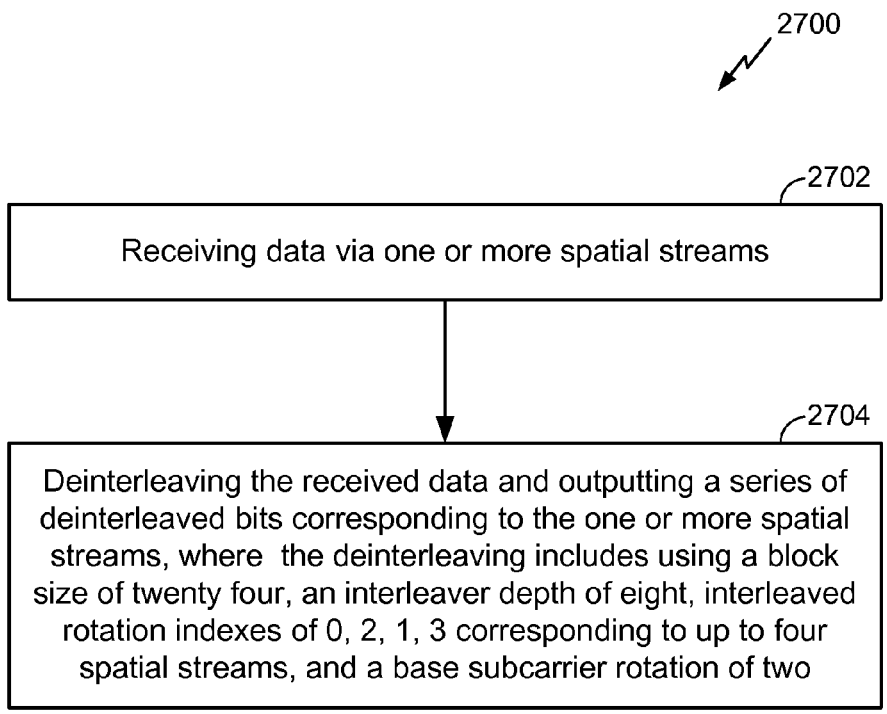
FIG. 27 shows a flow chart of an exemplary method of receiving and deinterleaving a data unit.

FIG. 27 shows a flow chart of an exemplary method of receiving and deinterleaving a data unit and is generally designated 2700. In block 2702, the method includes receiving data via one or more spatial streams. In block 2704, the method includes deinterleaving the received data and outputting a series of deinterleaved bits corresponding to the one or more spatial streams. The deinterleaving may use a block size of twenty four, an interleaver depth of 8, interleaved rotation indexes of 0, 2, 1, 3 corresponding to up to four spatial streams, and a base subcarrier rotation of two.

Figure 28:
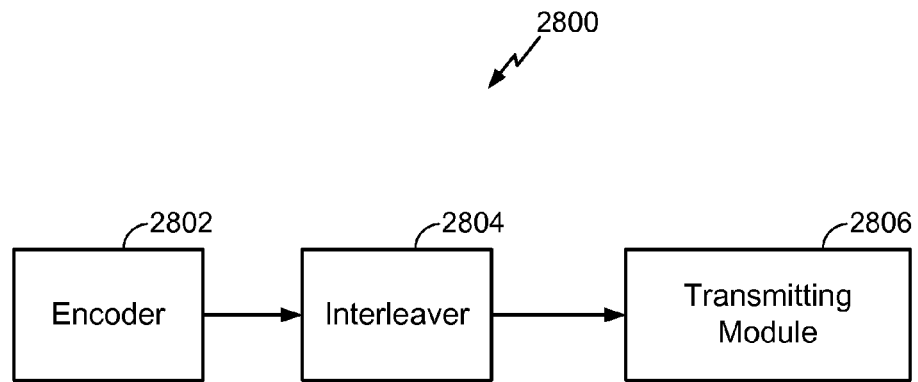
FIG. 28 is a functional block diagram of another exemplary wireless device that may be employed within the wireless communication system of FIG. 1.

FIG. 28 is a functional block diagram of another exemplary wireless device 2800 that may be employed within the wireless communication system 100. Those skilled in the art will appreciate that a wireless communication device may have more components than the wireless communication device shown in FIG. 28. The wireless communication device 2800 shown includes only those components useful for describing some prominent features of certain implementations. The device 2800 includes an encoder 2802 for encoding data for wireless transmission. In some cases a means for encoding may include the encoder 2802. The device 2800 further includes an interleaver 2804 for interleaving the encoded data from the encoder 2802 for transmission. The interleaver 2804 may be configured to perform one or more of the functions described above with respect to the block 2602 illustrated in FIG. 26. In some cases a means for interleaving may include the interleaver 2804. The means for interleaving (e.g., the interleaver 2804) may include one or more stream interleaving means (e.g., the stream interleavers 508a, 508b, and 508c of FIG. 5) corresponding to one or more spatial streams. The device 2800 further includes a transmitting module 2806 for wirelessly transmitting the output from the interleaver. The transmitting module 2806 may be configured to perform one or more of the functions described above with respect to the block 2604 illustrated in FIG. 26. The transmitting module 2804 may correspond to the transmitter 210. In some cases, a means for transmitting may include the transmitting module 2806. The transmitting module may include a variety of components including, but not limited to, a constellation mapper, a modulator, an IDFT (inverse discrete time fourier transform module or IFFT 304 as described above with reference to FIG. 3), a digital to analog converter, an amplifier, an antenna, and other components.

Figure 29:
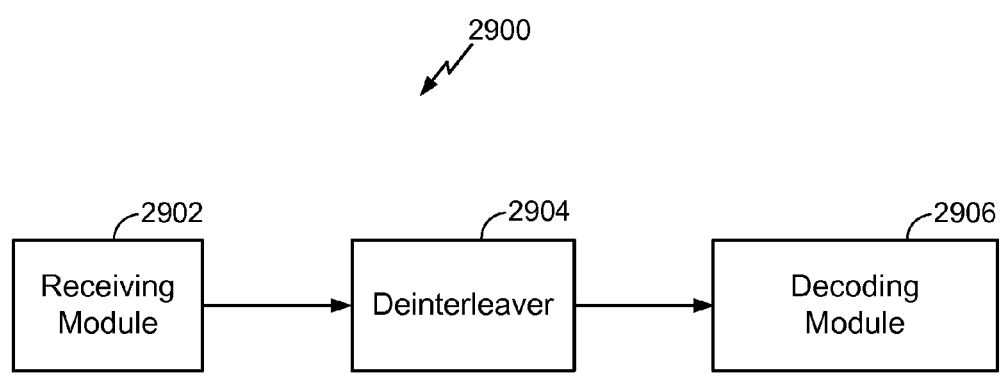
FIG. 29 is a functional block diagram of yet another exemplary wireless device that may be employed within the wireless communication system of FIG. 1.

FIG. 29 is a functional block diagram of yet another exemplary wireless device 2900 that may be employed within the wireless communication system 100. The device 2900 includes a receiving module 2902 for wirelessly receiving data. The receiving module 2902 may be configured to perform one or more of the functions described above with respect to the block 2702 illustrated in FIG. 27. The receiving module 2902 may correspond to the receiver 212 and may include the amplifier 401. In some cases, a means for receiving may include the receiving module 2902. The device 2900 further includes a deinterleaver 2904 deinterleaving received data. The deinterleaver 2904 may be configured to perform one or more of the functions described above with respect to the block 2704 illustrated in FIG. 27. In some cases a means for deinterleaving may include the deinterleaver 2904. The means for deinterleaving (e.g., the deinterleaver 2904) may include one or more stream deinterleaving means corresponding to one or more spatial streams. The device 2900 further includes a decoding module 2906 for decoding received and deinterleaved data. In some cases, a means for decoding may include the decoding module 2906.

One or more of the disclosed embodiments may be implemented in a system or an apparatus that may include a communications device, a fixed location data unit, a mobile location data unit, a mobile phone, a cellular phone, a computer, a tablet, a portable computer, or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-29 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above may be performed by any suitable means capable of performing the operations, such as various hardware and/or software component(s), circuits, and/or module(s). Generally, any operations illustrated in the FIGS. 1-29 may be performed by corresponding functional means capable of performing the operations. Skilled artisans may implement the described functionality in varying ways for each particular application, but such implementation decisions should not be interpreted as causing a departure from the scope of the present disclosure.

Those of skill in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer-readable storage media and communication media including any medium that facilitates transfer of a computer program from one place to another. A storage media may be any available media that can be accessed by a computer. By way of example, and not limitation, such computer-readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other medium that can be used to store desired program code in the form of instructions or data structures and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal In the alternative, the processor and the storage medium may reside as discrete components in a computing device or user terminal.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Thus, in some aspects computer readable medium may include a non-transitory computer readable medium (e.g., tangible media). In addition, in some aspects computer readable medium may include a transitory computer readable medium (e.g., a signal). Combinations of the above should also be included within the scope of computer-readable media.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may include a computer program product for performing the operations presented herein. For example, such a computer program product may include a computer-readable storage medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, a physical storage medium such as a compact disc (CD) or floppy disk, etc. Moreover, any other suitable technique for providing the methods and techniques described herein to a device can be utilized.

It is to be understood that the claims are not limited to the precise configuration and components illustrated above.

The previous description of the disclosed embodiments is provided to enable a person skilled in the art to make or use the disclosed embodiments. While the foregoing is directed to aspects of the present disclosure, other and further aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A wireless communications apparatus comprising:
   an interleaver configured to interleave encoded data and to output a series of interleaved bits, the interleaver comprising one or more stream interleavers corresponding to one or more spatial streams, the one or more stream interleavers configured to perform interleaving based on:
   a block size of twenty four;
   an interleaver depth of eight;
   interleaved rotation indexes of 0, 2, 1, 3 corresponding to up to four spatial streams; and
   a base subcarrier rotation of less than or equal to nine; and
   a transmit module configured to transmit the interleaved bits included in the one or more spatial streams.

2. The wireless communication apparatus of claim 1, wherein the base subcarrier rotation is equal to two.

3. The wireless communication apparatus of claim 1, further comprising one or more antennas configured to transmit the one or more spatial streams.

4. The wireless communication apparatus of claim 1, wherein the interleaver comprise a stream parser configured to parse the encoded data to each of the one or more stream interleavers.

5. The wireless communication apparatus of claim 1, wherein the transmit module is configured to transmit using a 1 MHz multiple input multiple output orthogonal frequency-division multiplexing (MIMO-OFDM) transmission.

6. The wireless communication apparatus of claim 1, wherein the transmit module is configured to transmit orthogonal frequency-division multiplexing (OFDM) symbols comprising 24 data tones.

7. The wireless communication apparatus of claim 1, wherein the rotation indexes 0, 2, 1, and 3 correspond to a first spatial stream, a second spatial stream, a third spatial stream, and a fourth spatial stream, respectively.

8. The wireless communication apparatus of claim 1, wherein subcarrier rotation of a particular stream interleaver is a function of the interleaved rotation index of a corresponding spatial stream index multiplied by the base subcarrier rotation.

9. The wireless communication apparatus of claim 1, further comprising an encoder configured to provide the encoded data to the interleaver.

10. The wireless communication apparatus of claim 1, wherein the transmit module comprises a modulator configured to modulate the interleaved bits.

11. A method of interleaving data, the method comprising:
interleaving encoded data and outputting a series of interleaved bits to be transmitted in one or more spatial streams, wherein the interleaving comprises:
using a block size of twenty four;
using an interleaver depth of eight;
using interleaved rotation indexes of 0, 2, 1, 3 corresponding to up to four spatial streams; and
using a base subcarrier rotation of less than or equal to nine; and
transmitting the interleaved bits included in the one or more spatial streams.

12. The method of claim 11, wherein the base subcarrier rotation is equal to two.

13. The method of claim 11, wherein the transmitting comprises transmitting the interleaved bits using one or more antennas.

14. The method of claim 11, further comprising parsing the encoded data corresponding to each of the one or more spatial streams.

15. The method of claim 11, wherein the transmitting comprises transmitting using a 1 MHz multiple input multiple output orthogonal frequency-division multiplexing (MIMO-OFDM) transmission.

16. The method of claim 11, wherein the transmitting comprises transmitting orthogonal frequency-division multiplexing (OFDM) symbols comprising 24 data tones.

17. The method of claim 11, wherein the rotation indexes 0, 2, 1, and 3 correspond to a first spatial stream, a second spatial stream, a third spatial stream, and a fourth spatial stream, respectively.

18. The method of claim 11, wherein subcarrier rotation associated with the interleaving is a function of the interleaved rotation index of a corresponding spatial stream index multiplied by the base subcarrier rotation.

19. The method of claim 11, further comprising encoding input data to generate the encoded data.

20. The method of claim 11, further comprising modulating the interleaved bits.

21. A wireless communications apparatus comprising:
means for interleaving encoded data to output a series of interleaved bits, the means for interleaving comprising one or more stream interleaving means corresponding to one or more spatial streams, the one or more stream interleaving means for performing interleaving based on:
a block size of twenty four;
an interleaver depth of eight;
interleaved rotation indexes of 0, 2, 1, 3 corresponding to up to four spatial streams; and
a base subcarrier rotation of less than or equal to nine; and
means for transmitting the interleaved bits included in the one or more spatial streams.

22. A non-transitory computer-readable medium comprising instructions that, when executed by a computer, cause the computer to:
interleave encoded data and output a series of interleaved bits to be transmitted via one or more spatial streams, wherein interleaving the encoded data comprises:
using a block size of twenty four;
using an interleaver depth of eight;
using interleaved rotation indexes of 0, 2, 1, 3 corresponding to up to four spatial streams; and
using a base subcarrier rotation of less than or equal to nine; and
transmit the interleaved bits included in the one or more spatial streams.

23. A wireless communications apparatus comprising:
a receive module configured to receive data included in one or more spatial streams; and
a deinterleaver configured deinterleave the received data, the deinterleaver comprising one or more stream deinterleavers corresponding to the one or more spatial streams, the one or more stream deinterleavers configured to perform deinterleaving based on:
a block size of twenty four;
an interleaver depth of eight;
interleaved rotation indexes of 0, 2, 1, 3 corresponding to up to four spatial streams; and
a base subcarrier rotation of less than or equal to nine.

24. The wireless communication apparatus of claim 23, wherein the base subcarrier rotation is equal to two.

25. The wireless communication apparatus of claim 23, wherein the receive module is configured to receive the data via a 1 MHz multiple input multiple output orthogonal frequency-division multiplexing (MIMO-OFDM) transmission.

26. The wireless communication apparatus of claim 23, wherein the receive module is configured to receive orthogonal frequency-division multiplexing (OFDM) symbols comprising 24 data tones.

27. The wireless communication apparatus of claim 23, wherein the rotation indexes 0, 2, 1, and 3 correspond to a first spatial stream, a second spatial stream, a third spatial stream, and a fourth spatial stream, respectively.

28. The wireless communication apparatus of claim 23, wherein subcarrier rotation of a particular stream deinterleaver is a function of the interleaved rotation index of the corresponding spatial stream index multiplied by the base subcarrier rotation.

29. The wireless communication apparatus of claim 23, further comprising a decoder configured to decode output data of the deinterleaver.

30. The wireless communication apparatus of claim 23, wherein the receive module comprises a demodulator configured to demodulate received data.

31. A method of deinterleaving data, the method comprising:
receiving data via one or more spatial streams; and
deinterleaving the received data and outputting a series of deinterleaved bits corresponding to the one or more spatial streams, wherein the deinterleaving comprises:
using a block size of twenty four;
using an interleaver depth of eight;
using interleaved rotation indexes of 0, 2, 1, 3 corresponding to up to four spatial streams; and
using a base subcarrier rotation of less than or equal to nine.

32. The method of claim 31, wherein the base subcarrier rotation is equal to two.

33. The method of claim 31, wherein the receiving comprises receiving the one or more spatial streams via one or more antennas.

34. The method of claim 31, wherein the receiving comprises receiving a 1 MHz multiple input multiple output orthogonal frequency-division multiplexing (MIMO-OFDM) transmission.

35. The method of claim 31, wherein the receiving comprises receiving orthogonal frequency-division multiplexing (OFDM) symbols comprising 24 data tones.

36. The method of claim 31, wherein the rotation indexes 0, 2, 1, and 3 correspond to a first spatial stream, a second spatial stream, a third spatial stream, and a fourth spatial stream, respectively.

37. The method of claim 31, wherein subcarrier rotation associated with the deinterleaving is a function of the interleaved rotation index of a corresponding spatial stream index multiplied by the base subcarrier rotation.

38. The method of claim 31, further comprising decoding the received data.

39. The method of claim 31, further comprising demodulating the received data.

40. A wireless communications apparatus comprising:
means for receiving data via one or more spatial streams; and
means for deinterleaving the received data, the means for deinterleaving comprising one or more stream deinterleaving means corresponding to the one or more spatial streams, the one or more stream deinterleaving means for performing deinterleaving based on:
a block size of twenty four;
an interleaver depth of eight;
interleaved rotation indexes of 0, 2, 1, 3 corresponding to up to four spatial streams; and
a base subcarrier rotation of less than or equal to nine.

41. A non-transitory computer-readable medium comprising instructions that, when executed by a computer, cause the computer to:
receive data via one or more spatial streams; and
deinterleave the received data and output a series of deinterleaved bits corresponding to the one or more spatial streams, wherein deinterleaving one or more spatial stream comprises:
using a block size of twenty four;
using an interleaver depth of eight;
using interleaved rotation indexes of 0, 2, 1, 3 corresponding to up to four spatial streams; and
using a base subcarrier rotation of less than or equal to nine.

42. An apparatus comprising:
an interleaver configured to interleave encoded data and to output a series of interleaved bits to be transmitted via a 1 MHz orthogonal frequency-division multiplexing (OFDM) transmission, wherein the interleaver is configured to use an interleaver depth of eight and a base subcarrier rotation of two;
a modulator configured to modulate the interleaved bits;
a transform module configured to transform the modulated bits; and
a transmit module configured to transmit a signal corresponding to the transformed bits in one or more spatial streams of the 1 MHz OFDM transmission.

43. The apparatus of claim 42, wherein the transform module is configured to perform a 32 point size transform.

44. An apparatus comprising:
a receive module configured to receive bits included in one or more spatial streams of a 1 MHz orthogonal frequency-division multiplexing (OFDM) transmission;
a transform module configured to transform the received bits;
a demodulator configured to demodulate the transformed bits; and
a deinterleaver configured to deinterleave the demodulated bits and to output data corresponding to the one or more spatial streams, wherein the deinterleaver is configured to use an interleaver depth of eight and a base subcarrier rotation of two.

45. The apparatus of claim 42, wherein the interleaver is configured to use interleaved rotation indexes of 0, 2, 1, 3 corresponding to up to four spatial streams.

* * * * *